US012050008B2

(12) United States Patent
Schmitt et al.

(10) Patent No.: US 12,050,008 B2
(45) Date of Patent: Jul. 30, 2024

(54) BURNER SYSTEM AND METHOD OF OPERATION

(71) Applicant: Spark Thermionics, Inc., Berkeley, CA (US)

(72) Inventors: Felix Schmitt, Berkeley, CA (US); Jared William Schwede, Berkeley, CA (US); David Rich, Berkeley, CA (US); Tyler Sandberg, Berkeley, CA (US)

(73) Assignee: Spark Thermionics, Inc., Berkeley, CA (US)

( * ) Notice: Subject to any disclaimer, the term of this patent is extended or adjusted under 35 U.S.C. 154(b) by 0 days.

(21) Appl. No.: 18/086,082

(22) Filed: Dec. 21, 2022

(65) Prior Publication Data

US 2023/0332768 A1 Oct. 19, 2023

Related U.S. Application Data

(60) Provisional application No. 63/434,260, filed on Dec. 21, 2022, provisional application No. 63/292,263, filed on Dec. 21, 2021.

(51) Int. Cl.
*F23D 99/00* (2010.01)
*H01J 45/00* (2006.01)

(52) U.S. Cl.
CPC .............. *F23D 91/02* (2015.07); *H01J 45/00* (2013.01); *F23D 2900/3102* (2021.05)

(58) Field of Classification Search
CPC ... F23D 91/02; F23D 2900/3102; H01J 45/00
See application file for complete search history.

(56) References Cited

U.S. PATENT DOCUMENTS 2,244,800 A * 6/1941 Pascale ................. F22B 37/101 122/367.2
2,417,670 A * 3/1947 Anthes ................ B01F 25/4522 239/536
2,863,074 A * 12/1958 Johnstone ............... H01J 45/00 310/306

(Continued)

FOREIGN PATENT DOCUMENTS

CA 2367686 A1 10/2000
CN 204285609 U 4/2015

(Continued)

OTHER PUBLICATIONS

Martini, W. R.; "Flame Heated Thermionic Converter Research"; Atomics International; Jan. 1964 (Year: 1964).*

(Continued)

*Primary Examiner* — Jorge A Pereiro
*Assistant Examiner* — Logan P Jones
(74) *Attorney, Agent, or Firm* — Jeffrey Schox; Samuel Rosenthal

(57) ABSTRACT

A burner system, preferably including input plumbing, a combustion region, and an exhaust section. In some embodiments, the burner system can include, be attached to, be configured to couple with, and/or be otherwise associated with a thermionic energy converter (TEC). A method of burner system operation, preferably including operating the burner system in a combustion mode and optionally including operating a TEC.

20 Claims, 26 Drawing Sheets

(56) References Cited

U.S. PATENT DOCUMENTS

| | | | | | |
|---|---|---|---|---|---|
| 3,123,726 | A * | 3/1964 | Maynard | H01J 45/00 363/113 |
| 3,137,798 | A * | 6/1964 | Noyes | H01J 45/00 136/235 |
| 3,155,849 | A | 11/1964 | Lawrence et al. | |
| 3,173,032 | A | 3/1965 | Maynard | |
| 3,201,618 | A | 8/1965 | Coleman | |
| 3,243,612 | A * | 3/1966 | Lyczko | H01J 45/00 310/306 |
| 3,258,616 | A * | 6/1966 | Martini | H01J 45/00 310/306 |
| 3,460,524 | A | 8/1969 | Lazaridis | |
| 3,477,012 | A | 11/1969 | Laing | |
| 3,482,120 | A | 12/1969 | Wilson | |
| 3,740,592 | A | 6/1973 | Engdahl et al. | |
| 3,843,896 | A | 10/1974 | Rason et al. | |
| 3,932,776 | A | 1/1976 | Dunlay et al. | |
| 4,038,022 | A * | 7/1977 | Blackman | F23L 15/04 431/166 |
| 4,199,713 | A | 4/1980 | Forster | |
| 4,408,461 | A * | 10/1983 | Bruhwiler | F23R 3/286 60/737 |
| 5,174,371 | A * | 12/1992 | Grillo | F28F 1/22 165/171 |
| 5,495,829 | A | 3/1996 | Jayaraman et al. | |
| 5,612,588 | A | 3/1997 | Wakalopulos | |
| 5,675,972 | A | 10/1997 | Edelson | |
| 6,065,961 | A * | 5/2000 | Shaffer | F23D 14/02 431/278 |
| 10,056,538 | B1 | 8/2018 | Boyd | |
| 10,546,990 | B2 | 1/2020 | Schwede et al. | |
| 11,133,757 | B2 | 9/2021 | Lorimer et al. | |
| 11,205,554 | B1 | 12/2021 | Riley et al. | |
| 2008/0061158 | A1 | 3/2008 | Nakagawa et al. | |
| 2009/0071526 | A1 | 3/2009 | Parker | |
| 2010/0019619 | A1 | 1/2010 | Hagg | |
| 2010/0104450 | A1 | 4/2010 | Longoni et al. | |
| 2010/0139771 | A1 | 6/2010 | Schwede et al. | |
| 2011/0100430 | A1 | 5/2011 | Zak et al. | |
| 2011/0139205 | A1 | 6/2011 | Kimura et al. | |
| 2011/0221328 | A1 | 9/2011 | Nemanich et al. | |
| 2011/0226299 | A1 | 9/2011 | Makansi | |
| 2012/0111386 | A1 | 5/2012 | Bell et al. | |
| 2012/0299438 | A1 | 11/2012 | Kimura et al. | |
| 2014/0020730 | A1 | 1/2014 | Imran et al. | |
| 2014/0109582 | A1* | 4/2014 | Shershnyov | F23R 3/12 60/737 |
| 2014/0187016 | A1 | 7/2014 | Malhotra et al. | |
| 2014/0190169 | A1* | 7/2014 | Melton | B01F 25/31 60/738 |
| 2014/0306575 | A1 | 10/2014 | Paxton et al. | |
| 2017/0016631 | A1 | 1/2017 | Shaffer | |
| 2018/0151791 | A1* | 5/2018 | Mays | H10N 10/17 |
| 2019/0027347 | A1 | 1/2019 | Schwede et al. | |
| 2019/0196465 | A1 | 6/2019 | Hummelshøj | |
| 2020/0119249 | A1 | 4/2020 | Schwede et al. | |
| 2020/0144039 | A1* | 5/2020 | Schmitt | H01J 45/00 |
| 2020/0321203 | A1* | 10/2020 | Schmitt | H01J 45/00 |

FOREIGN PATENT DOCUMENTS

| | | | |
|---|---|---|---|
| FR | 1253481 | A * | 3/1960 |
| GB | 968392 | A * | 9/1964 |
| JP | H0575104 | A | 3/1993 |
| JP | 2011124412 | A | 6/2011 |
| JP | 2012514856 | A | 6/2012 |
| WO | 2010078521 | A1 | 7/2010 |
| WO | 2018204470 | A1 | 11/2018 |

OTHER PUBLICATIONS

Kim, J. , et al., “Kelvin probe and ultraviolet photoemission measurements of indium tin oxide work function: a comparison”, Synthetic Metals, vol. 111-112, pp. 311-314, Jun. 1, 2000; <URL: https://www.sciencedirect.com/science/articles/abs/pii/S0379677999003549>; abstract;section 2, p. 313; table1.

Martini, W.R. , et al., “Internal flame-heated thermionic converters”, In Thermionic specialist conference, p. 356. 1963.

Meza, Lucas R., “Strong, lightweight, and recoverable three-dimensional ceramic nanolattices”, Sep. 12, 2014 • vol. 345 Issue 6202.

Raja, W. , et al., “Photon-Enhanced Thermionic Emission”, Final Report, Instituto Italiano di Technolgia (IIT), May 10, 20215, pp. 1-28 (Year: 2015).

Riley, Daniel C , “Application of Semiconductors to Thermionic Energy Converters”, A Dissertation Submitted to the Department of Physics and the Committee on Graduate Studies of Stanford University, Jun. 2015.

Schaedler, T.A. , “Ultralight Metallic Microlattices”, Nov. 18, 2011 vol. 334 Science www.sciencemag.org.

Schwede, Jared W. , et al., “Photon-enhanced 1-15 thermionic emission for solar concentrator systems”, Nature Materials, vol. 9, No. 9, Aug. 1, 2010 (Aug. 1, 2010).

Schwede, J.W. , et al., “Photon-enhanced thermionic emission from heterostructures with low interface recombination”, Nature Communications, vol. 4, No. 1, Jun. 12, 2013 (Jun. 12, 2013), XP055759289, DOI: 10.1038/ncomms2577.

Varpula, Aapo , et al., “Diffusion-emission theory of photon enhanced thermionic emission solar energy harvesters”, Journal of Applied Physics, American Institute of Physics, US, vol. 112, No. 4, Aug. 15, 2012 (Aug. 15, 2012), pp. 44506-44506, XP012166538.

* cited by examiner

BURNER SYSTEM AND METHOD OF OPERATION

CROSS-REFERENCE TO RELATED APPLICATIONS

This application claims the benefit of U.S. Provisional Application Ser. No. 63/292,263, filed on 21 Dec. 2021, and of U.S. Provisional Application Ser. No. 63/434,260, filed on 21 Dec. 2022, each of which is incorporated in its entirety by this reference.

STATEMENT OF GOVERNMENT SUPPORT

This invention was made with government support under Contract Number W911NF-18-C-0057 awarded by the Defense Advanced Research Projects Agency and Contract Numbers W911QX-20-P-0017, W91CRB-20-P-0007, W91CRB-21-C-0032, and W911QX-22-C-0011 awarded by the U.S. Army. The government has certain rights in the invention.

TECHNICAL FIELD

This invention relates generally to the heating field, and more specifically to a new and useful burner system and method of operation.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1A:
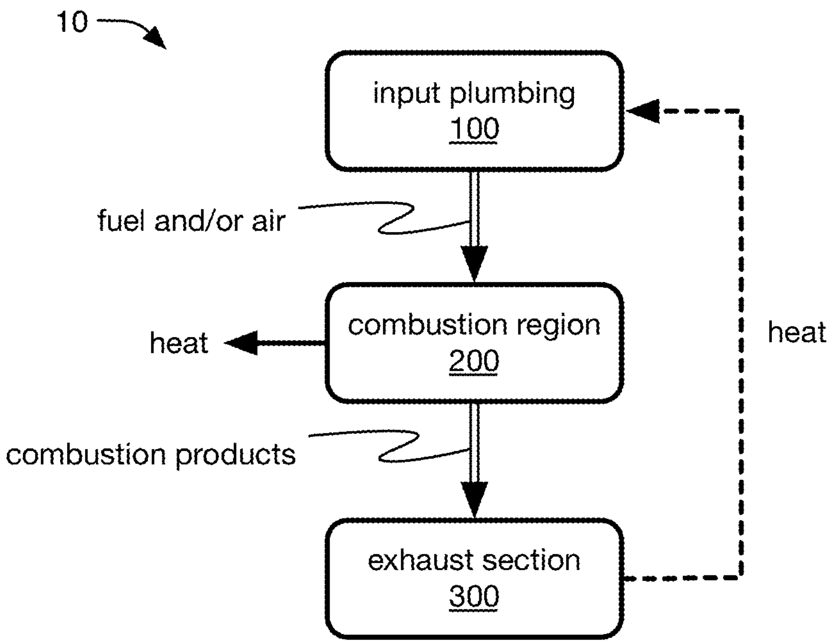
FIG. 1A is a schematic representation of an embodiment of a burner system.
Figure 1B:
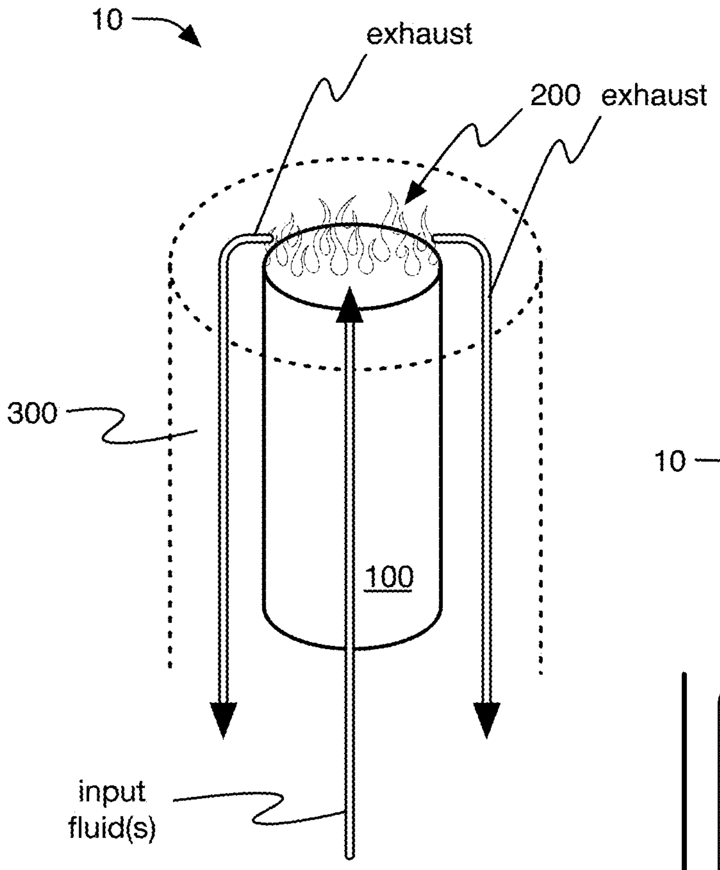
FIG. 1B is a schematic representation of an example of the burner system.

A burner system 10 preferably includes input plumbing 100, a combustion region 200, and an exhaust section 300 (e.g., as shown in FIGS. 1A-1B). In some embodiments, the burner system 10 can include, be attached to, be configured to couple with, and/or be otherwise associated with a thermionic energy converter (TEC). In such embodiments, the burner system is preferably configured to deliver heat to an emitter (and/or any other suitable elements) of the TEC.

For example, the burner system can be arranged within a heating cavity of the TEC (e.g., as shown by way of examples in FIGS. 2A-2B), such as described in U.S. patent application Ser. No. 16/883,762, filed 26 May 2020 and titled "SYSTEM AND METHOD FOR THERMIONIC ENERGY CONVERSION", which is herein incorporated in its entirety by this reference; in a specific example, the burners can be arranged and/or configured such as described regarding the 'power input 12' of U.S. patent application Ser. No. 16/883,762.

However, the burner system 10 can additionally or alternatively include any other suitable elements in any suitable arrangement.

A method 20 of burner system operation preferably includes operating the burner system in a combustion mode S210 (e.g., in which the burner system combusts fuel and air, and delivers some or all of the resulting heat to a heat reception region, such as a region of a TEC). The method 20 can optionally include adjusting between different combustion modes (e.g., involving different fuel flow rates, fuel-air ratios, temperatures, etc.), transitioning between the combustion mode(s) and an inactive mode (e.g., in which no or substantially no combustion occurs), switching between different fuels and/or fuel sources, and/or any other suitable elements. In some examples, the method 20 can optionally include performing one or more preheating operations (e.g., using one or more preheating elements such as hot surface igniters, spark igniters, any other suitable electrical heat-generation elements, and/or any other suitable preheating elements); such preheating operations can function, for example, to preheat portions of the burner system (e.g., burner, supporting tubes, etc.), such as to elevate such portions from a low or ambient temperature up to a temperature that can support facile ignition of the burner. Further, the method 20 can optionally include operating a TEC S220.

The method 20 is preferably performed using the burner system 10 described herein. However, the method 20 can additionally or alternatively be performed using any other suitable system.

2. Benefits

Variants of the technology can optionally confer one or more benefits.

First, some variants of the technology can efficiently deliver heat to a heat reception element (e.g., of a thermionic energy converter). In particular, some such variants of the technology can efficiently deliver heat axially and/or substantially axially (e.g., along a long axis defined by a burner system), such as preferentially delivering heat axially rather than radially and/or substantially radially (e.g., radially outward from the long axis defined by the burner system). This can, for example, facilitate heating of a thermionic energy converter having a geometry such as described in U.S. patent application Ser. No. 17/866,381, filed 15 Jul. 2022 and titled "SYSTEM AND METHOD FOR THERMIONIC ENERGY CONVERSION", which is herein incorporated in its entirety by this reference (e.g., heating the emitter of such a thermionic energy converter to reach and/or maintain temperature within a desired operation temperature range).

Second, some variants of the technology can enable one or more desirable burner characteristics. Such characteristics can include, in examples: high heat recuperation and/or efficiency, low pressure drop, fast startup and/or shutdown (e.g., having minimal transients associated therewith), system longevity, low emissions generation (e.g., low emissions of greenhouse gasses), and/or any other suitable characteristics.

However, variants of the technology can additionally or alternatively confer any other suitable benefits.

3. Burner System

The burner system 10 preferably includes a recuperating burner (e.g., self-recuperative burner). Accordingly, hot exhaust from the burner preferably transfers heat (e.g., as it flows downstream from the combustion region 200 via an exhaust path defined by the exhaust section 300) to the input fluids to be combusted (e.g., air and/or fuel), more preferably as these input fluids flow through the input plumbing 100 before reaching the combustion region 200.

The burner is preferably operable across a range of temperatures and/or input fluid delivery rates (e.g., fuel flow rates). Further, the burner is preferably operable to turn on and/or off (and/or to transition between operation modes associated with such different temperatures and/or input fluid delivery rates) rapidly, easily, and/or with minimal transient behavior during these transition(s). In some examples, these characteristics can enable and/or facilitate progression through a TEC startup process (e.g., in which the burner provides some or all of the input heat for this startup process).

In some embodiments, the burner can be operable to combust a variety of different fuels (e.g., gaseous and/or liquid fuels, such as natural gas, kerosene, JP-8, etc.), such as combusting different fuels alone and/or in combination.

The burner system preferably includes a small-scale burner, such as a burner producing on the order of hundreds of watts of power (e.g., approximately 100, 150, 200, 300, 450, 1000, 100-200, 200-450, and/or 450-1000 W, etc.) or less (e.g., 10, 20, 35, 50, 75, less than 10, 10-20, 20-45, and/or 45-100 W, etc.), rather than producing several kilowatts or more. For example, the burner system can produce approximately 200 W. In typical systems, it may be difficult to realize such a small-scale burner (especially one which operates at high temperatures, such as greater than 1000, 1100, 1200, 1300, 1400, and/or 1500° C., etc.), due to potentially challenging limitations such as reduced flame volume (and the resulting adiabatic flame temperature). Herein, we describe embodiments of a burner system that can overcome some or all of these challenges.

However, the burner system can additionally or alternatively produce several kilowatts or more (e.g., 1.5, 2, 3, 4.5, 10, 15, 20, 30, 45, 100, 1-2, 2-4.5, 4.5-10, 10-20, 20-45, 45-100, or more than 100 kW, etc.).

Although referred to herein as 'air', a person of skill in the art will recognize that the burner system can additionally or alternatively be configured to burn fuel in the presence of any other suitable oxygen-containing fluid (e.g., substantially pure oxygen) and/or any other suitable oxidant. Accordingly, a person of skill in the art will recognize that, as used herein, 'air' is not intended to be limited specifically to atmospheric gasses, but rather, in some embodiments, it can additionally or alternatively represent one or more other oxygen-containing fluids and/or oxidants.

3.1 Input Plumbing.

The input plumbing 100 preferably functions to deliver air and/or fuel to the combustion region. These fluids to be combusted are preferably pre-heated before reaching the combustion region, such as by receiving heat from the exhaust as it flows downstream from the combustion region 200 via an exhaust path defined by the exhaust section 300.

The fluids to be combusted (e.g., air and/or fuel) are preferably pre-mixed when supplied by the input plumbing (e.g., as an approximately stoichiometric mixture, as a fuel-lean or fuel-rich mixture, etc.), such as wherein the fluids are mixed within the input plumbing and/or upstream of the input plumbing. However, the fluids can alternately be provided separately (e.g., provided via separate air and fuel input structures), can be partially-premixed, such as wherein a mixture of air and fuel can be provided separately from an additional supply of air and/or fuel, to be mixed downstream (e.g., in the combustion region), and/or can be provided in any other suitable manner.

The input plumbing preferably assists in holding the flame within the combustion region 200, such as by preventing autoignition within the input plumbing and/or flashback (e.g., from the combustion region) into the input plumbing, and/or by otherwise maintaining the flame at and/or near the heat reception element.

The input plumbing 100 preferably includes (e.g., is made of) one or more materials capable of tolerating high temperatures (e.g., temperatures arising from heat generated within the combustion region and/or delivered into the input plumbing from the exhaust). For example, the input plumbing can include one or more metals, ceramics (e.g., alumina, silicon carbide, silicon nitride, zirconia, sapphire, silica, etc.), and/or any other suitable materials.

The input plumbing preferably includes one or more fluid conveyance structures (FCSs) 101. The FCSs can include pipes, tubes, and/or any other suitable structures for conveying the fluids to be combusted into the combustion region. Each FCS preferably leads from an inlet 110 (e.g., from which air and/or fuel is received) to an outlet 120 (e.g., at which the air and/or fuel are provided to the combustion region 200), such as shown by way of examples in FIGS. 3A-3D, 4A-4B, 5A-5B, 6, 7, 8A-8C, and/or 9A-9B.

The input plumbing 100 (e.g., one or more FCSs 101 thereof) can optionally include one or more flow restrictors 130. The flow restrictors can function to prevent combustion outside the combustion region (e.g., prevent combustion within the FCSs and/or other elements of the input plumbing), such as by preventing autoignition within and/or flashback into the input plumbing.

For efficient burner operation, the input plumbing 100 preferably facilitates efficient flow of the fluids to be combusted, as a pressure drop in the input plumbing corresponds directly to a loss of system efficiency (e.g., due to the power required to supply input fluids, such as air, while sustaining this pressure drop). Accordingly, the overall input plumbing (e.g., the FCSs thereof) are preferably wide enough to enable efficient flow. As such, the flow restrictors preferably restrict flow substantially only in the region in which they are needed to prevent premature combustion, including portions of the input plumbing that are at elevated temperatures (e.g., sufficiently high to allow autoignition) and/or in close proximity to the combustion engine (e.g., close enough to enable flashback into the input plumbing). However, the flow restrictors can additionally or alternatively restrict flow throughout the entire length of an FCS or in any other suitable regions thereof.

In a first embodiment, the flow restrictor 130 narrows the flow cross-section of the FCS (and/or otherwise impedes flow through the FCS). In a specific example, in which an FCS includes a 1/16" outer diameter tube with 0.010" walls, the flow restrictor can decrease the cross-sectional area in a region of the tube by approximately 50%, thereby preventing autoignition and flashback within this portion of the tube.

Figure 3A:
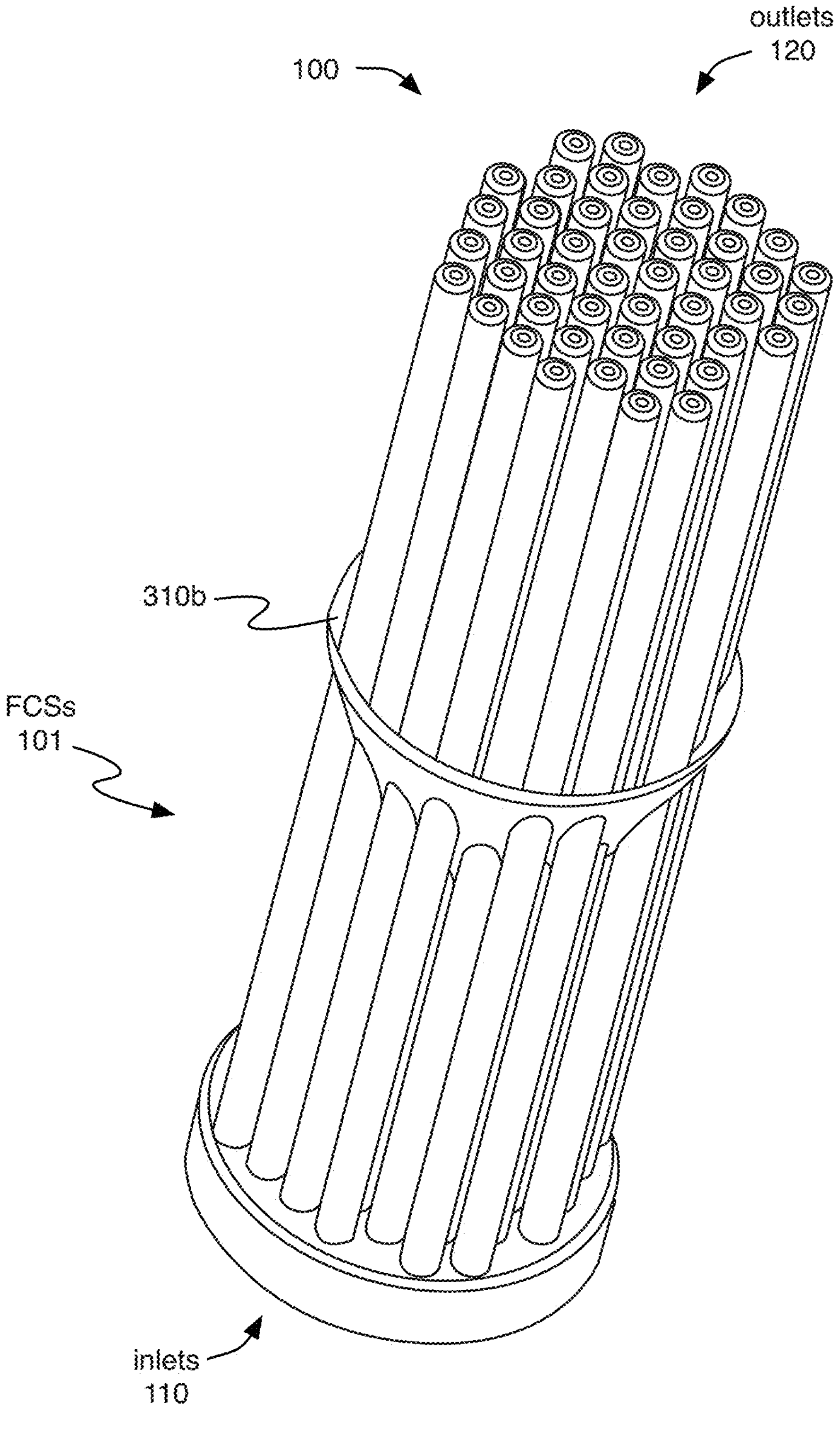
FIG. 3A is a trimetric view of a first specific example of a portion of the burner system.
Figure 3B:
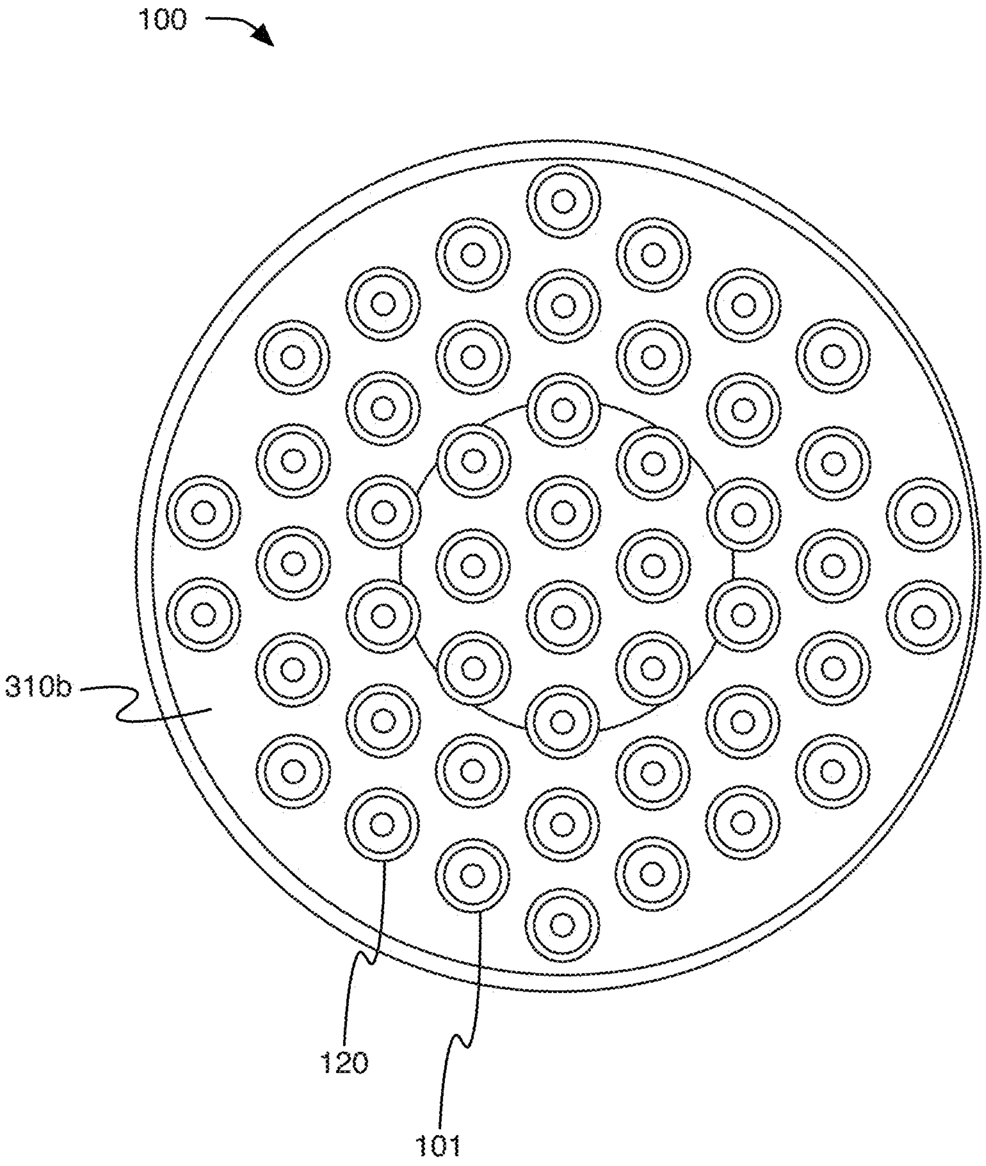
FIG. 3B is a top view of the first specific example.
Figure 3C:
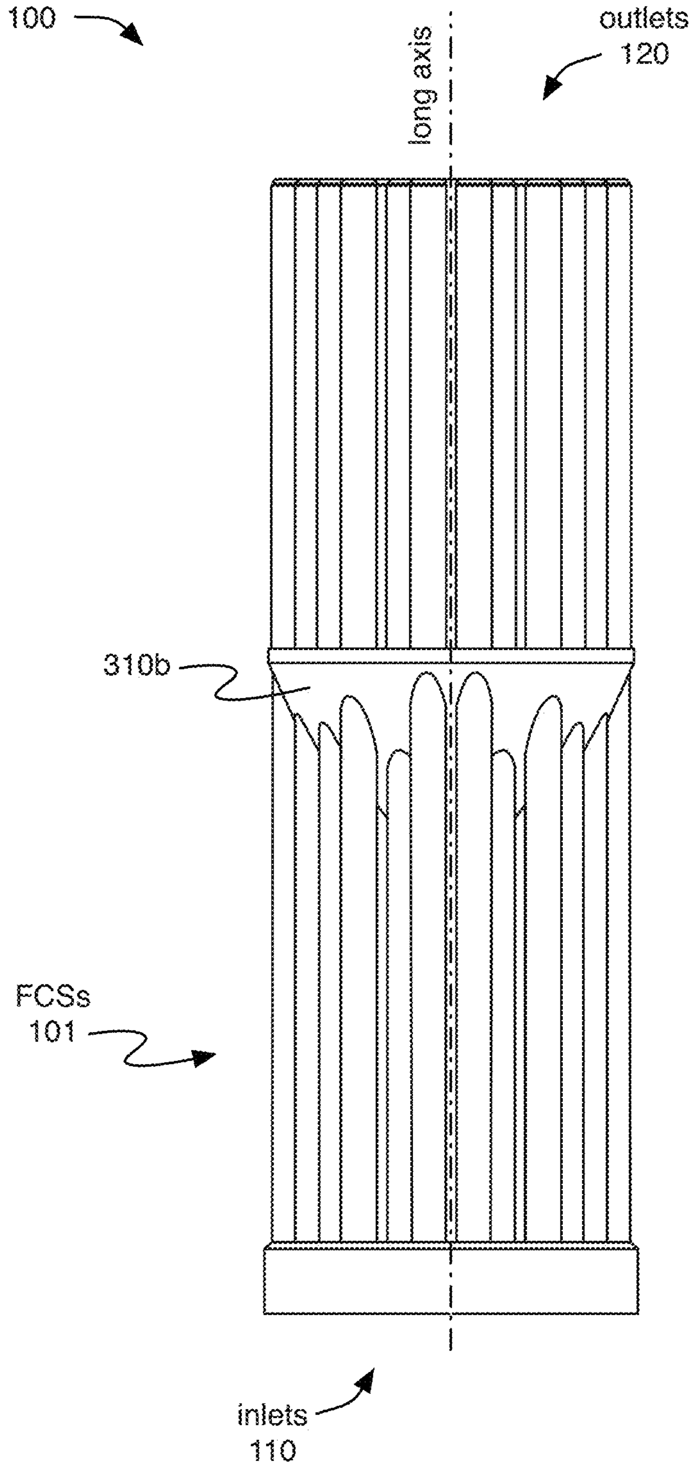
FIG. 3C is a side view of the first specific example.
Figure 3D:
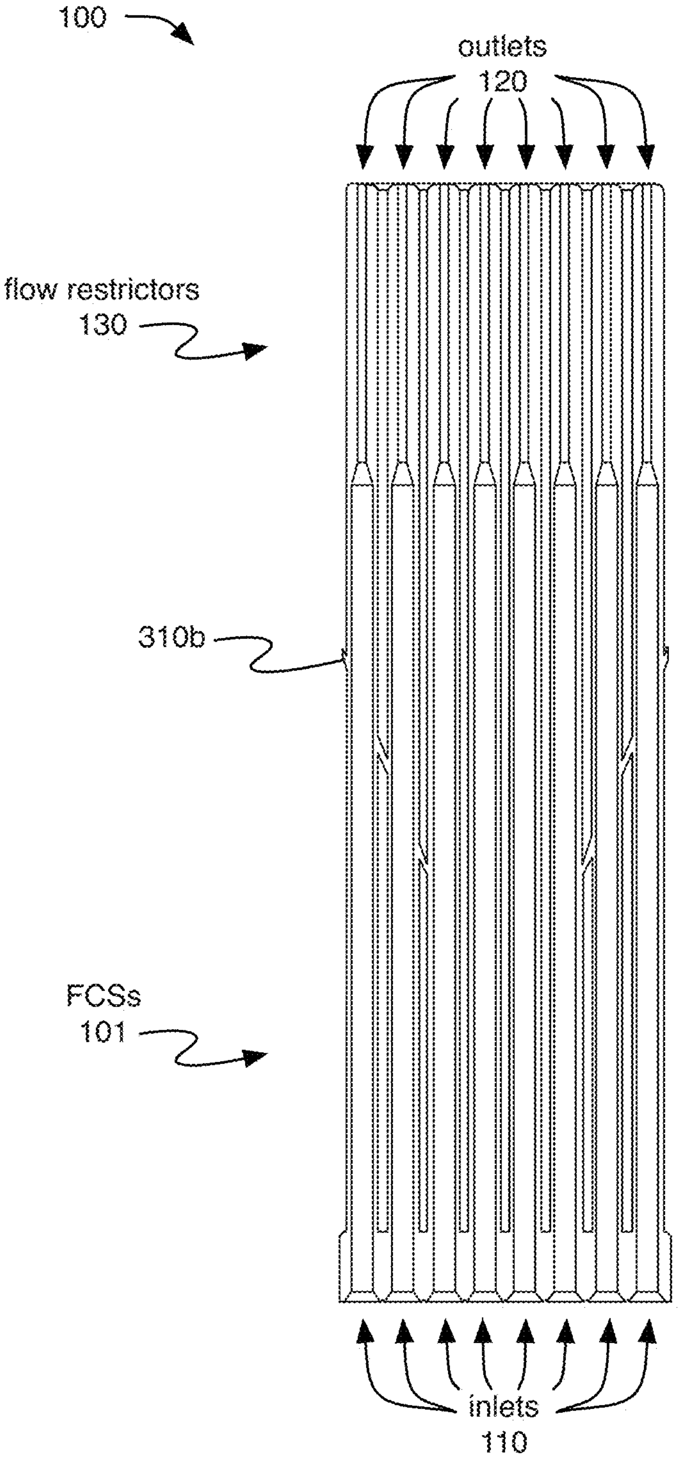
FIG. 3D is a cross-sectional side view of the first specific example.

In a first example, the cross-section is narrowed by tapering down the tube width, such as by increasing the tube wall thickness (e.g., as shown in FIG. 3D). However, this increased wall thickness can impede heat transfer from the exhaust into the input fluids, thereby reducing burner efficiency. Additionally or alternatively, the tube width could be tapered by necking down the tube (e.g., while keeping the wall thickness substantially constant).

In a second example, the flow restrictor can include a barrier within the tube (e.g., a wire or other obstacle inserted into and/or attached within the tube at the outlet end). In a third example, the flow restrictor can include one or more structures (e.g., arranged at and/or near the outlet) that define one or more tortuous and/or circuitous flow paths for fluids passing through them, which can include structures such as described below regarding the second embodiment and/or can include any other suitable structures.

However, the cross-section can additionally or alternatively be narrowed in any other suitable manner.

In a second embodiment, the flow restrictor is configured to induce turbulence at and/or near the outlet. For example, this can be achieved by arranging one or more structures that define one or more tortuous and/or circuitous flow paths for fluids passing through them at and/or near the outlet. These structures can include porous structures and/or any other suitable structures defining tortuous and/or circuitous paths. In examples, the porous structure could be a mesh (e.g., metal mesh) or foam (e.g., silicon carbide foam). The input plumbing can include a separate flow restrictor (e.g., porous structure) for each FCS (or a subset thereof) or can include one or more flow restrictors (e.g., porous structures) shared by multiple FCSs (e.g., shared by the entire input plumbing).

Such turbulence (e.g., arising from this turbulence-inducing flow restrictor, from any other suitable turbulence-inducing elements, etc.) can additionally or alternatively enhance heat transfer to the heat reception element (e.g., element arranged across the combustion region from the FCS outlets). Further, in examples in which the air and fuel are provided separately (e.g., via separate FCSs), such as examples in which the air and fuel are not premixed or only partially premixed, such turbulence (e.g., arising from this turbulence-inducing flow restrictor, from any other suitable turbulence-inducing elements, etc.) can additionally or alternatively be beneficial in promoting air/fuel mixing (e.g., within the combustion region).

However, the input plumbing (the FCSs thereof) can additionally or alternatively include any other suitable flow restrictors 130 in any suitable arrangement.

The input plumbing can optionally include one or more wicks. A wick is preferably included in embodiments of the burner configured to operate using liquid fuel (e.g., kerosene, JP-8, etc.), such as flex fuel burners configured to use any of a variety of fuels. In such embodiments, the wick can function to introduce and facilitate vaporization of the liquid fuel (e.g., within the input plumbing). In some examples, the wick leads from a liquid fuel source (e.g., fuel reservoir, fuel input tube, etc.) into the input plumbing upstream of the combustion region, whereas in other examples, the wick may exist only along a portion of that length, such as only within the input plumbing (e.g., wherein the liquid fuel source is delivered to the wick via one or more tubes, such as tubes through with the liquid fuel source can be pumped, wherein the system can optionally include one or more pumps to perform such pumping). The wick is preferably arranged within the input plumbing close enough to the combustion region that the temperature in the vicinity of the wick is high enough to vaporize the fuel, but far enough away from the combustion region that the temperature is sufficiently low to avoid liquid fuel coking and/or other undesired degradation (additionally or alternatively, burner materials that contact the fuel can be selected to avoid such coking and/or other undesired degradation). For example, the wick can be arranged upstream of, but close to, the FCSs (e.g., in an input manifold, at a position within a single input tube that branches into multiple FCSs downstream of the position). Alternatively, the wick can be arranged within one or more FCSs or have any other suitable arrangement. In some examples, the wick can be supported by one or more support structures. In some examples, the wick can include and/or be thermally coupled to one or more heating elements (e.g., electrical heating elements, such as nichrome wire and/or other resistive elements) and/or heat exchange elements (e.g., configured to deliver heat to the wick from other elements of the burner system and/or the fluids within it, such as hot gasses). Such heating elements can optionally function to preheat the wick (e.g., using one or more electrical heating elements) prior to burner operation (e.g., fuel combustion), to increase and/or maintain wick temperature (e.g., using one or more heat exchange elements) during burner operation (e.g., fuel combustion), and/or to maintain the wick above a threshold temperature during burner shutdown (e.g., using one or more electrical heating elements and/or heat exchange elements); such use can, in some examples, prevent and/or reduce coking during burner system startup, operation, and/or shutdown, and/or can have any other suitable function. In some examples, the wick can include (e.g., be made of) materials such as: steels (e.g., stainless steels), silicon carbide, silicon nitride, fused silica or fiberglass, and the like; however, the wick can additionally or alternatively include any other suitable materials. In some examples, the wick may not be maintained at a uniform or substantially uniform temperature, but rather may have a substantially varying temperature along its length (e.g., such that different volatile compounds are driven off the wick at different locations along its length).

Embodiments that include a wick are preferably configured to supply premixed air and fuel via the input plumbing (e.g., wherein air supplied through the input plumbing mixes with vaporized fuel at or near the wick). However, such embodiments can additionally or alternatively be configured in a diffusion flame configuration (e.g., in which air and fuel are supplied to the combustion region separately, in which a partially-premixed mixture of air and fuel are supplied together and supplemented by a separate supply of air and/or fuel to be mixed in the combustion region, etc.) and/or in any other suitable configuration.

Figure 5A:
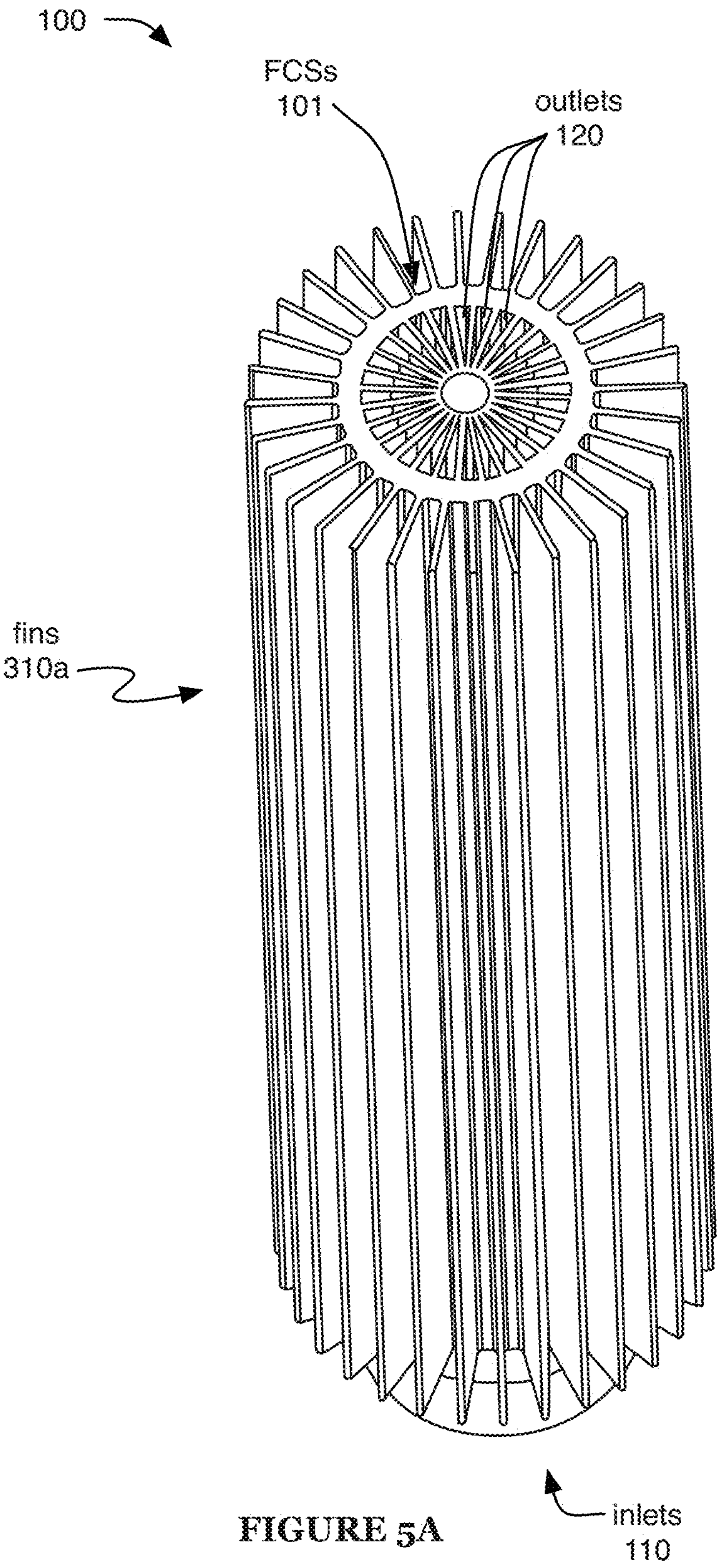
FIG. 5A is a trimetric view of a fourth specific example of a portion of the burner system.
Figure 5B:
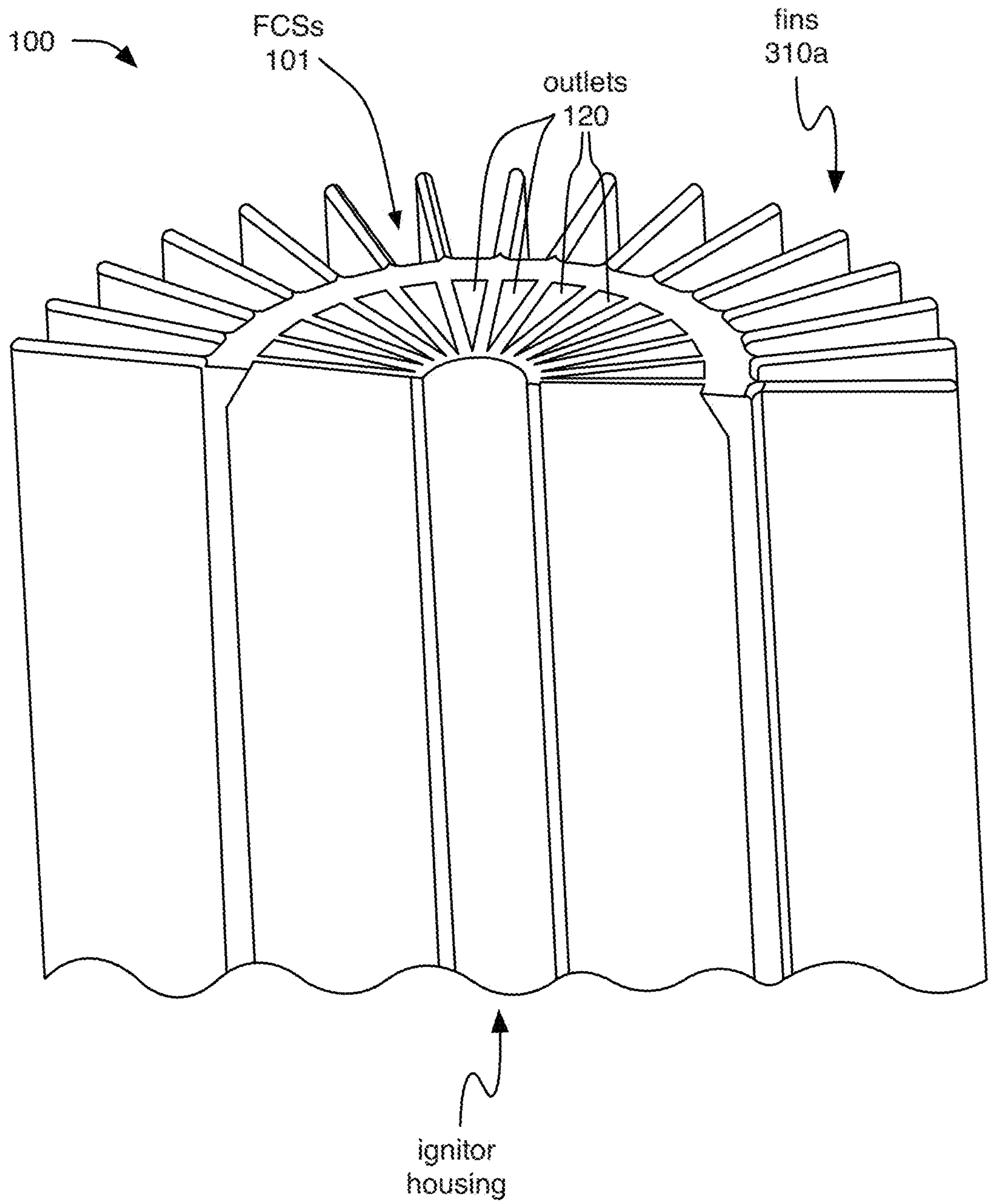
FIG. 5B is a cross-sectional trimetric detail view of a portion of the fourth specific example.
Figure 6:
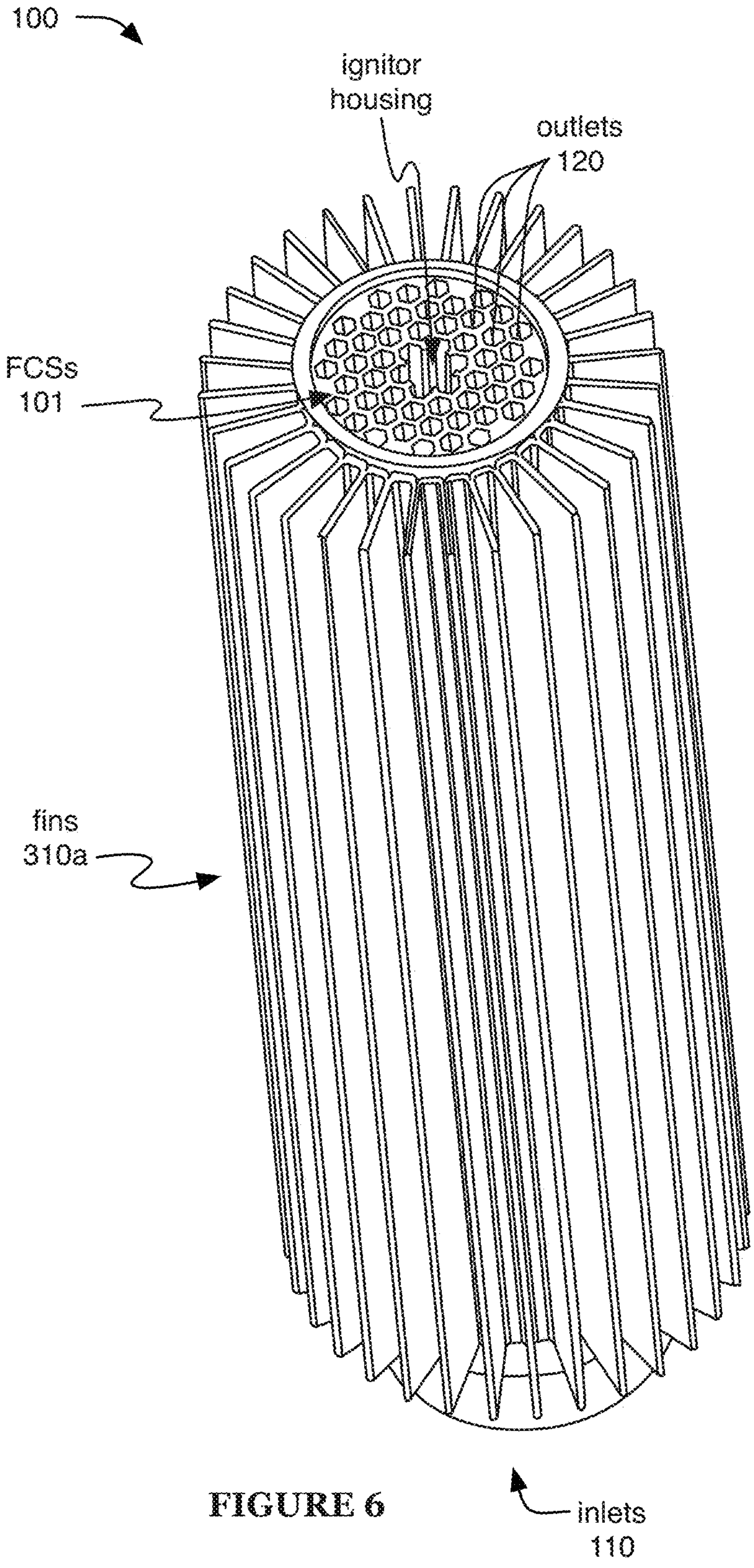
FIG. 6 is a trimetric view of a fifth specific example of a portion of the burner system.
Figure 7:
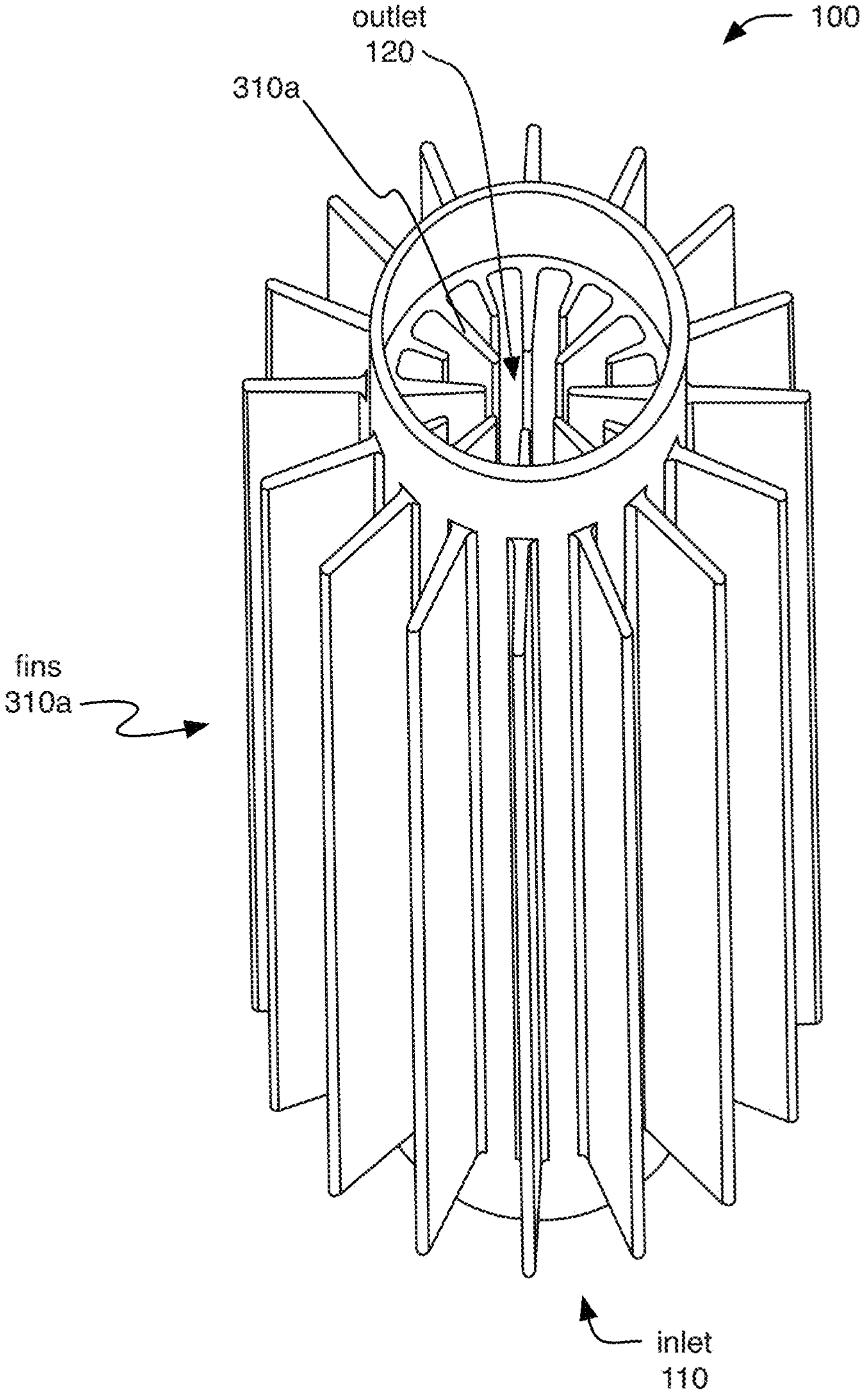
FIG. 7 is a trimetric view of a sixth specific example of a portion of the burner system.
Figure 8A:
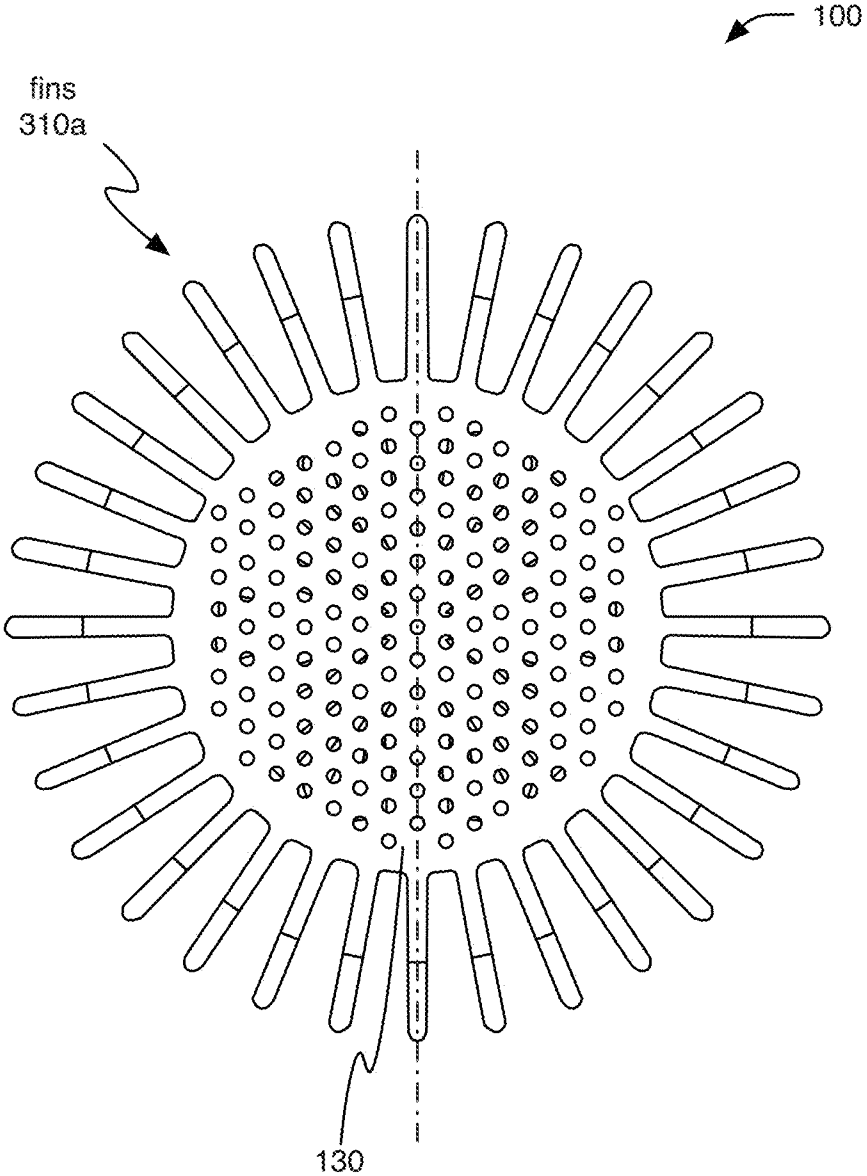
FIG. 8A is a top view of a seventh specific example of a portion of the burner system.
Figure 8B:
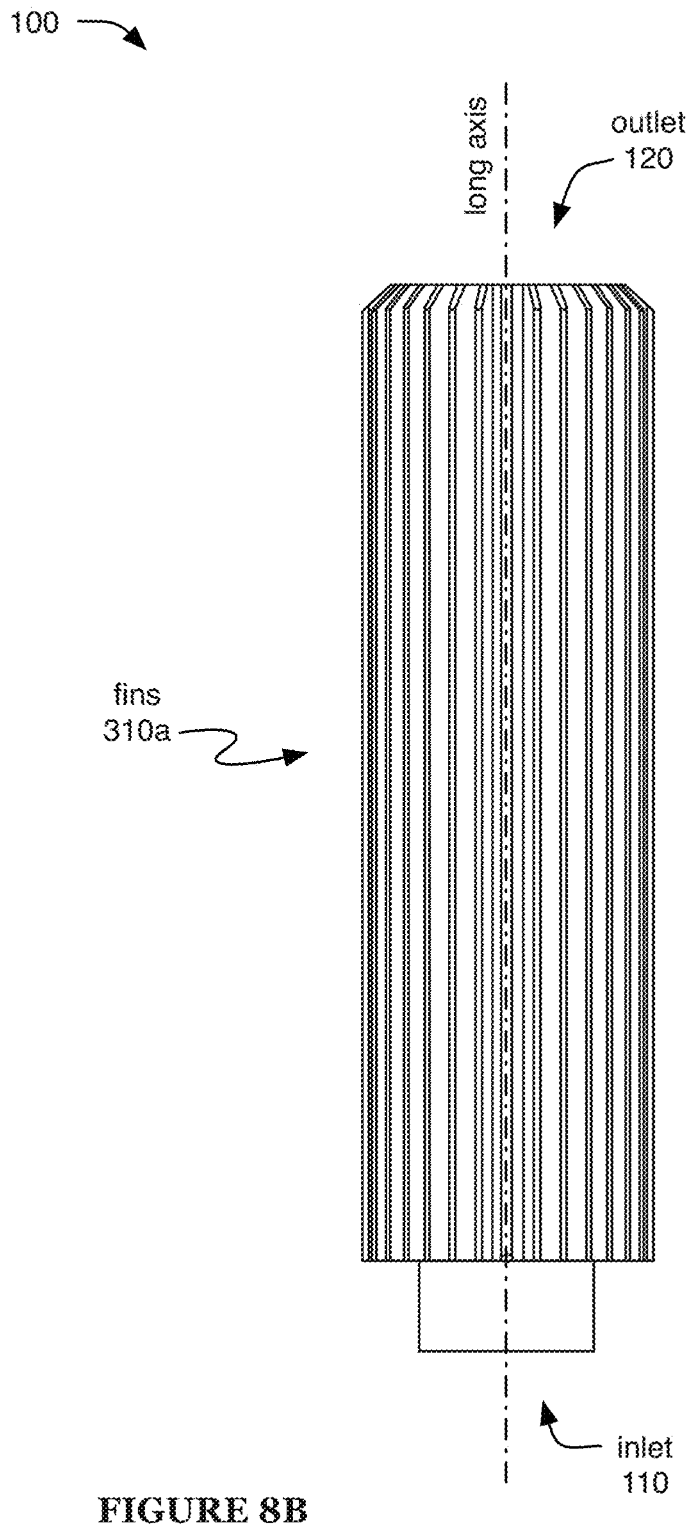
FIG. 8B is a side view of the seventh specific example.
Figure 8C:
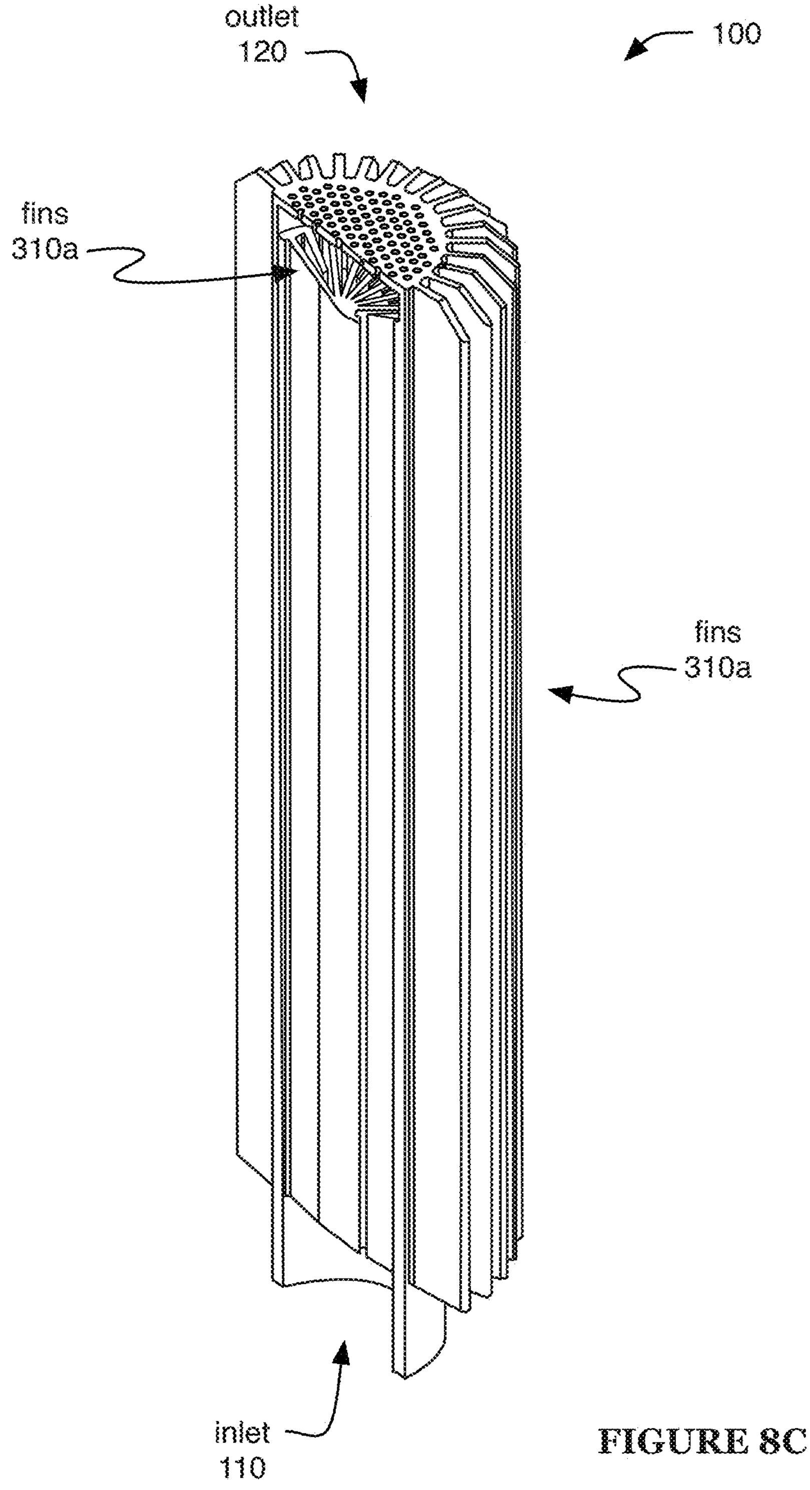
FIG. 8C is a cross-sectional isometric view of the seventh specific example.

The input plumbing can optionally define an ignitor housing (e.g., running parallel to the one or more FCSs), such as shown by way of examples in FIGS. 5A-5B and 6). The ignitor housing can contain an ignitor operable to ignite the input fluids, and/or can have any other suitable function.

In some embodiments, the input plumbing can include one or more heat exchange elements (e.g., baffles; protrusive elements such as fins, pins, and/or dowels; etc.). For example, the input plumbing can include one or more heat exchange elements having characteristics such as described below regarding heat exchange elements of the exhaust section (and/or having any other suitable characteristics). For example, the input plumbing can include one or more protrusive elements protruding into the FCS(s), such as shown by way of examples in FIGS. 7 and/or 8A-8C.

In some embodiments, the input plumbing 100 (and/or the FCSs 101 thereof) defines a long axis and a consistent (or substantially consistent) cross-section along the long axis (or along a subset thereof, such as along a first portion of the input plumbing), such as shown by way of examples in FIGS. 3A-3D, 5A-5B, 6, 7, 8A-8C, and/or 9A-9B; such a consistent (or substantially consistent) cross-section can enable fabrication of the input plumbing by extrusion (e.g., extrusion of a green body, before firing the green body to produce a hard ceramic body). In variations of these embodiments, the input plumbing may include multiple portions having different (e.g., substantially different) cross-sections from each other. For example, each such portion (or a subset thereof) could define a different consistent (or substantially consistent) cross-section (e.g., along the long axis, along different axes, etc.); in one example, a first portion can be associated with the majority of the length of the FCSs 101, and a second portion can be associated with the flow restrictors 130 near their end. In some examples of these variations, each such portion (or some of these portions) could be fabricated, such as fabricated separately from each other by extrusion, and then the different portions could be assembled (e.g., assembled into a unitary body such as a unitary green body that is assembled prior to firing into a unitary hard ceramic body, bonded together by adhesives and/or other materials, held together by mechanical means such as by fasteners, placed together without bonding such as held in place by friction and/or gravity, etc.). Additionally or alternatively, additive manufacturing processes (e.g., 3D printing, such as 3D printing of a green body) and/or subtractive manufacturing processes (e.g., machining, such as machining of a metal body and/or a fired ceramic body) may be used to fabricate and/or alter some or all of these portions (e.g., altering an extrusion via one or more additive and/or subtractive manufacturing processes). For example, the input plumbing can include two portions fabricated from a single extrusion, wherein the first portion is defined by a section of the extrusion as-extruded, and the second portion is fabricated from another section of the extrusion by one or more additive and/or subtractive manufacturing processes (e.g., depositing additional material by 3D printing to define one or more flow restrictors, removing material by machining to increase tube diameters such that the unmachined section of the extrusion defines one or more flow restrictors, etc.).

Figure 9A:
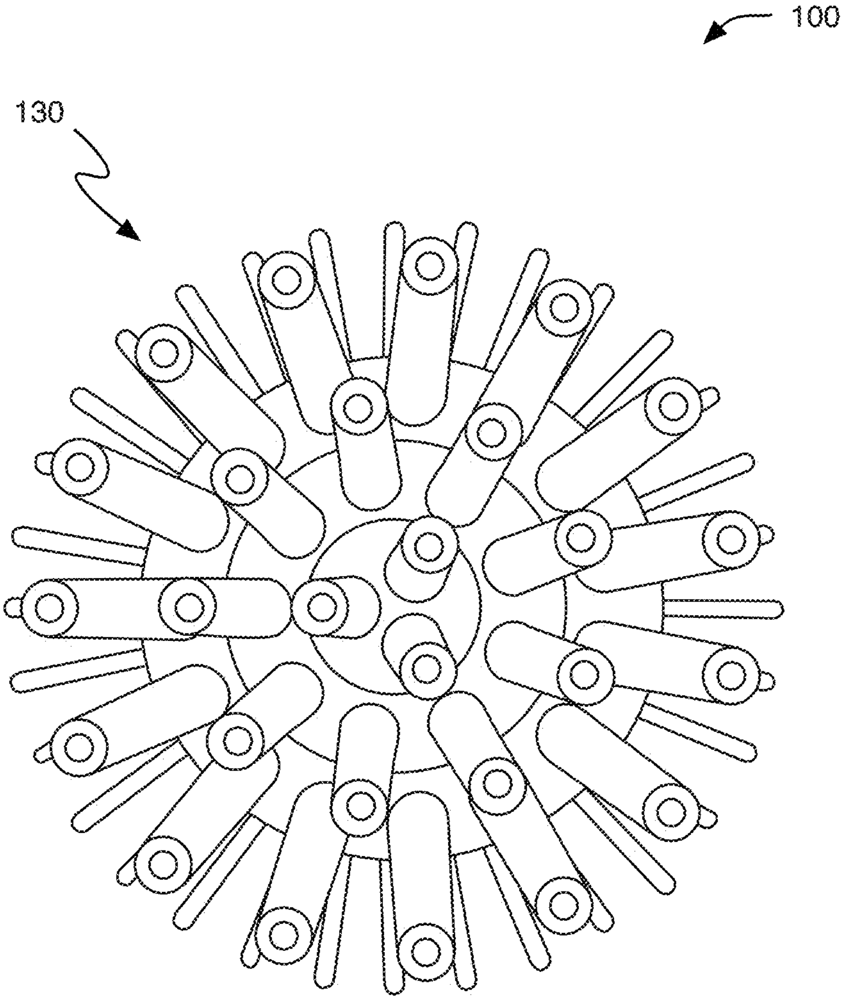
FIG. 9A is a top view of an eighth specific example of a portion of the burner system.
Figure 9B:
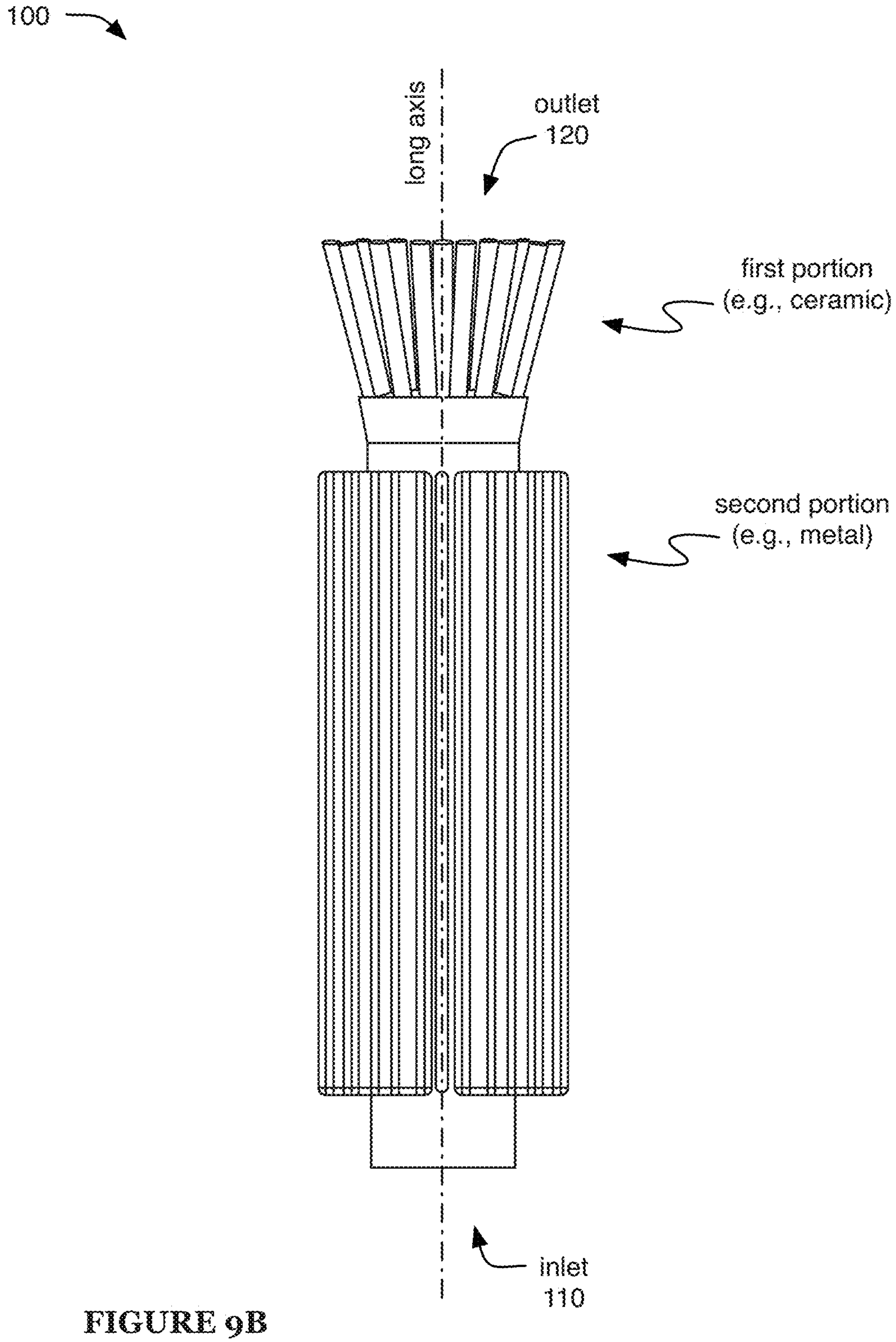
FIG. 9B is a side view of the eighth specific example.
Figure 10A:
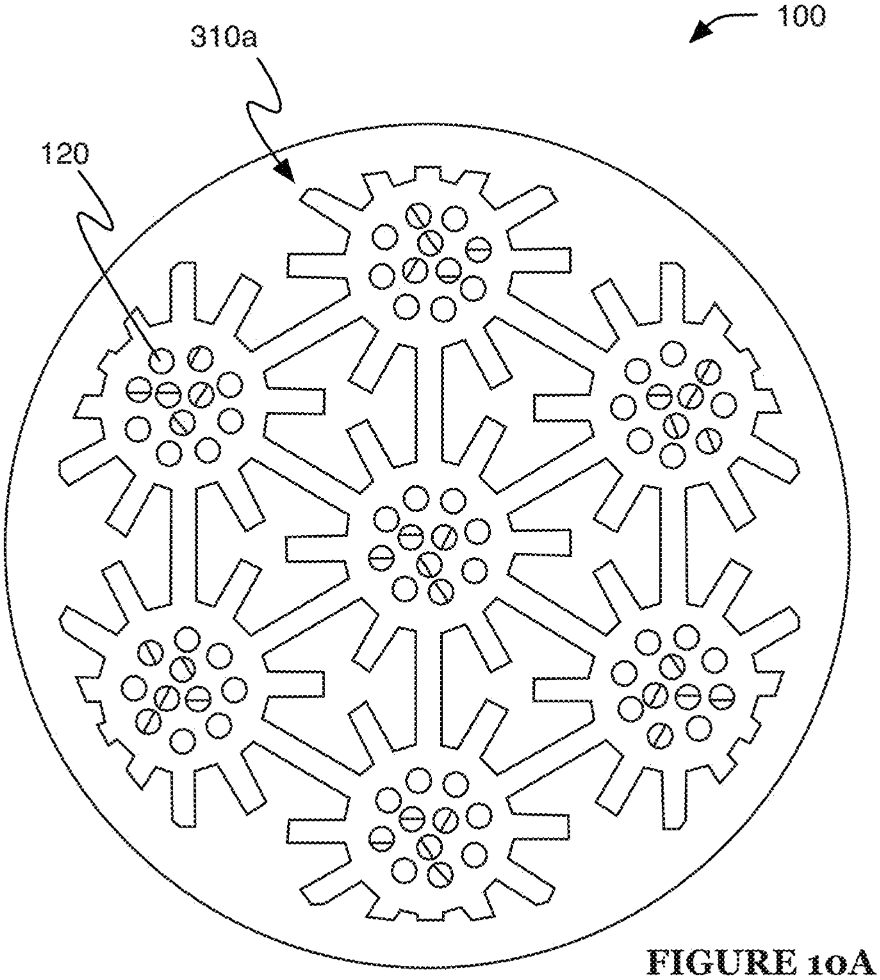
FIGS. 10A-10B are a top view and a side view, respectively, of a ninth specific example of a portion of the burner system.
Figure 10B:
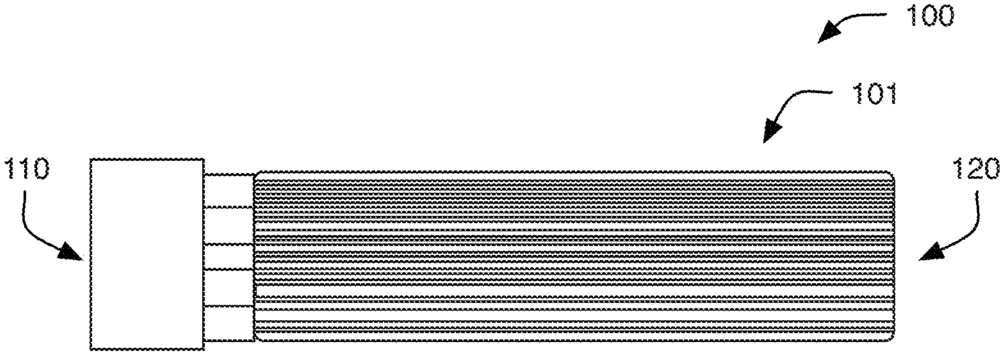
Figure 10C:
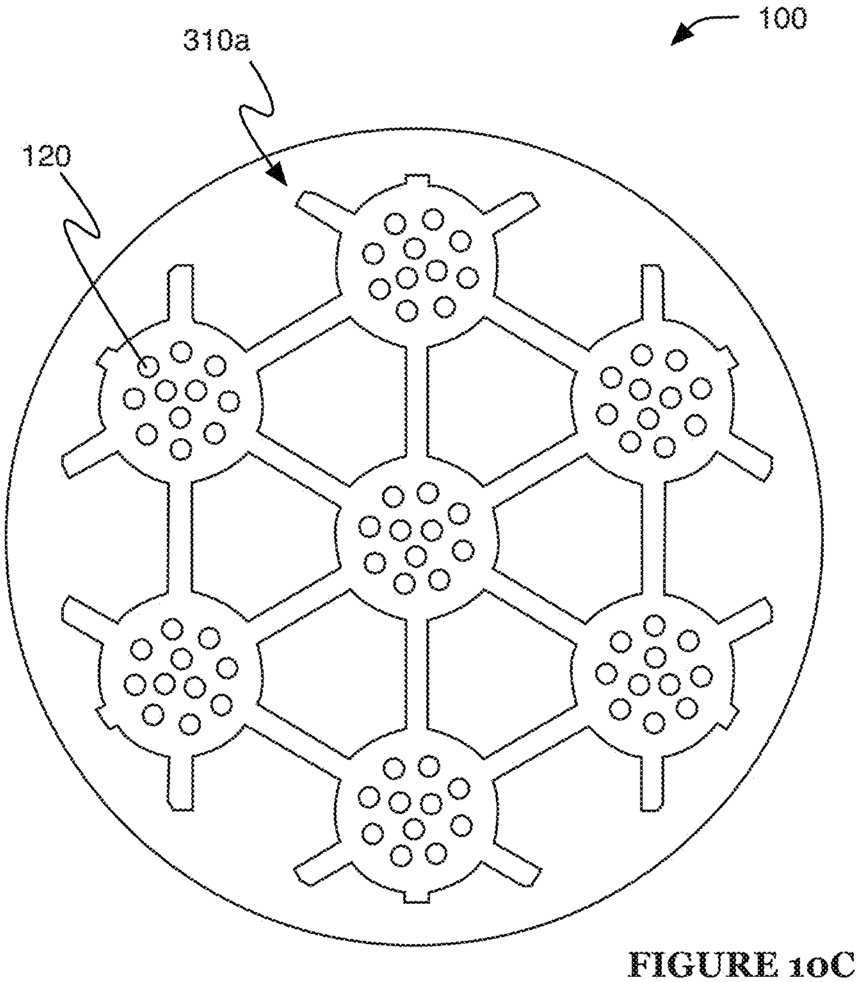
FIGS. 10C-10D are a top view and a side view, respectively, of a tenth specific example of a portion of the burner system.
Figure 10D:
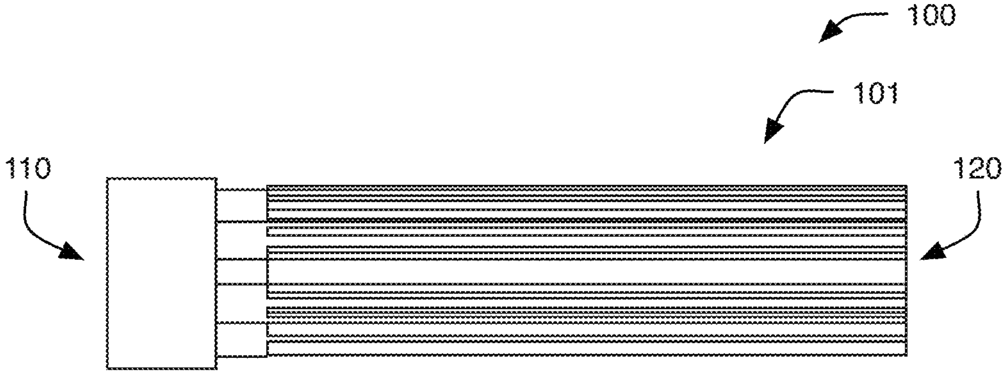
Figure 10E:
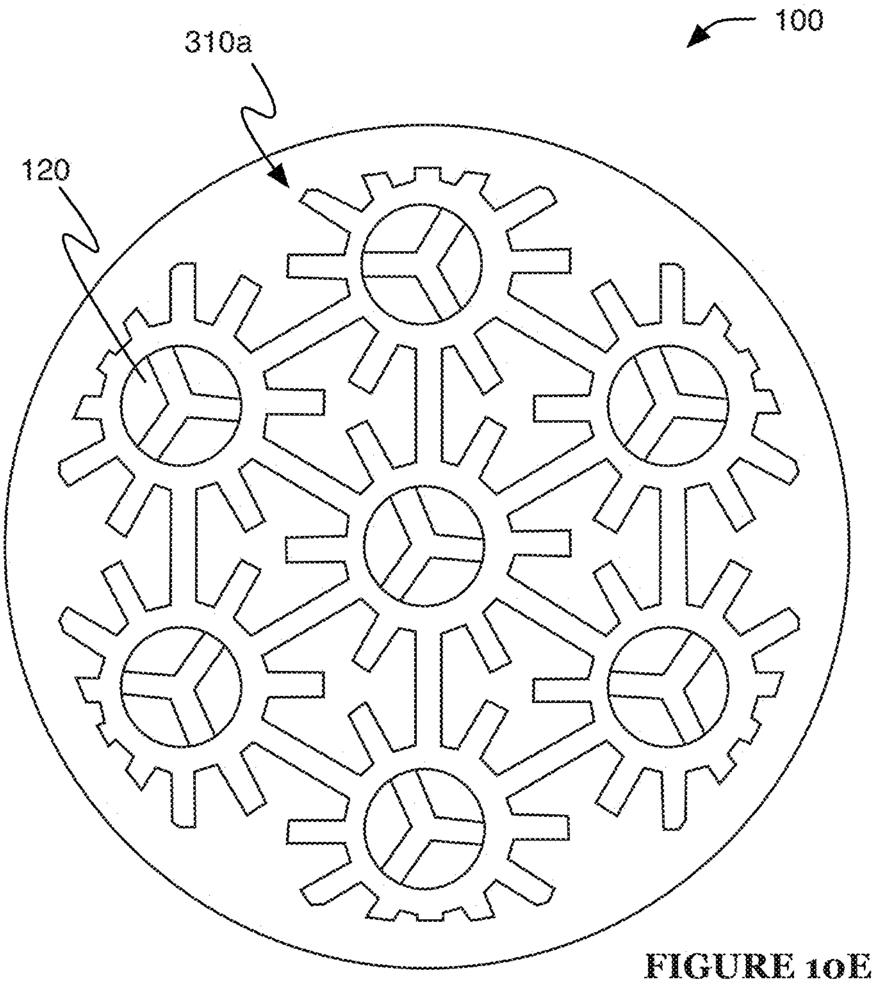
FIGS. 10E-10F are a top view and a side view, respectively, of an eleventh specific example of a portion of the burner system.
Figure 10F:
Figure 10G:
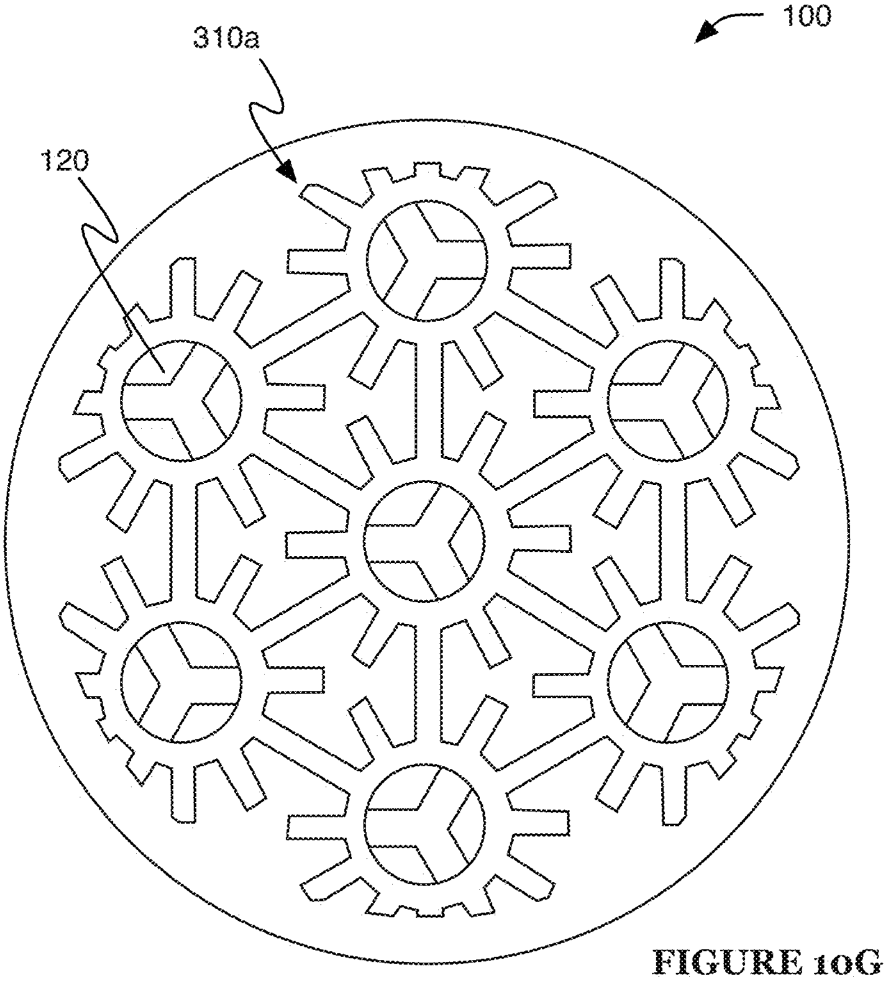
FIGS. 10G-10H are a top view and a side view, respectively, of a twelfth specific example of a portion of the burner system.
Figure 10H:
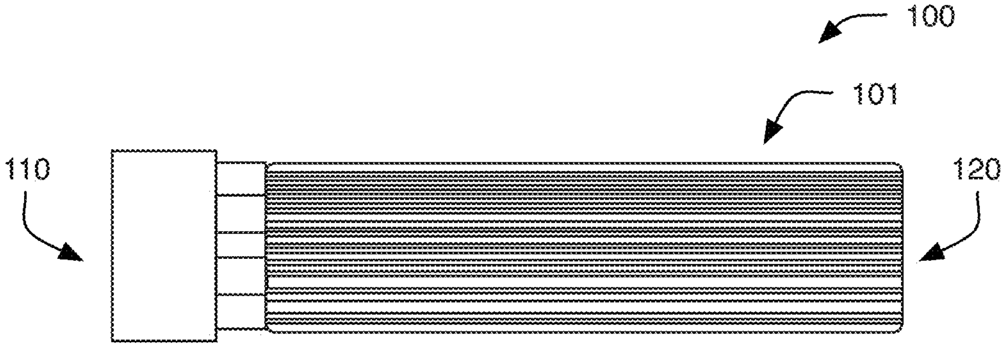
Figure 11A:
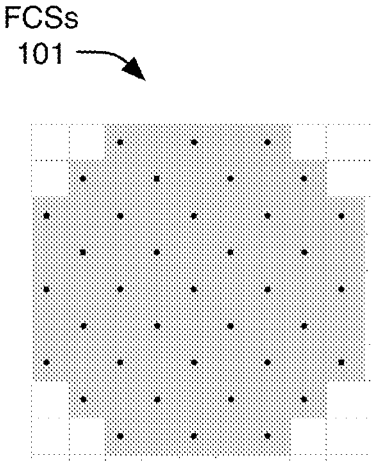
FIGS. 11A-11F are top views of various specific examples of arrangements of fluid conveyance structures of the burner system.
Figure 11B:
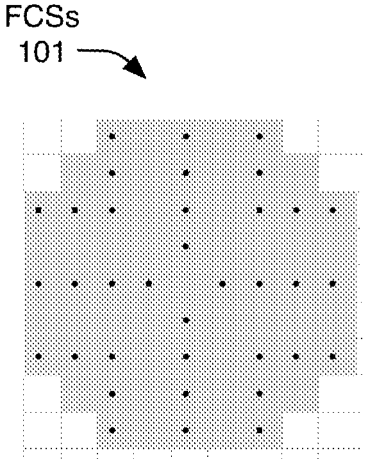
Figure 11C:
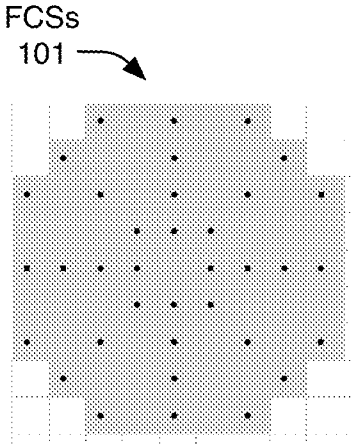
Figure 11D:
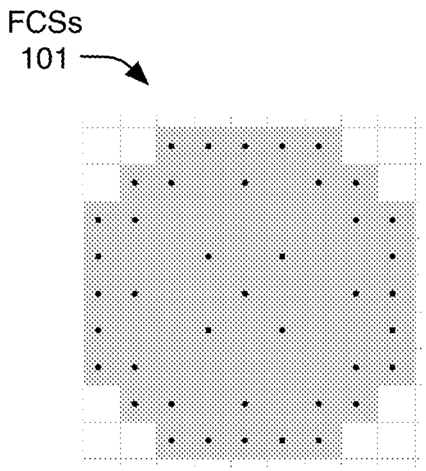
Figure 11E:
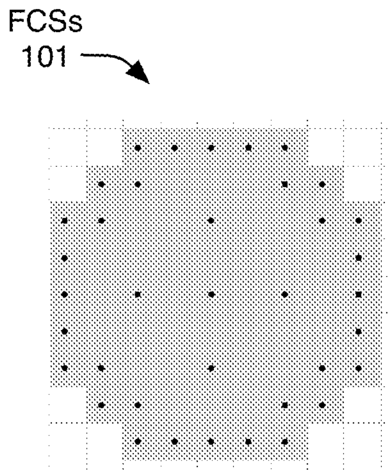
Figure 11F:
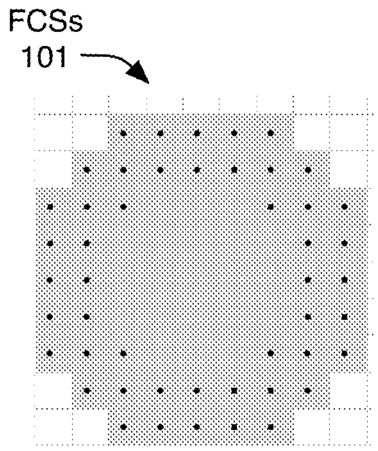

In some embodiments, the input plumbing 100 (and/or the FCSs 101 thereof) can include (e.g., be made of) mixed materials, such as having two or more portions that include distinct materials from each other. In one such embodiment, the input plumbing includes a first portion arranged in and/or near (e.g., adjacent to) the combustion zone, and a second portion arranged upstream of the first portion. In this embodiment, the first portion (e.g., which, during system operation, may experience the highest temperatures of any portion of the input plumbing) preferably includes (e.g., is made of) one or more ceramic materials, whereas the second portion (e.g., which, during system operation, may experience lower temperatures than the first portion) may include (e.g., be made of) one or more metal materials (e.g., high-temperature or refractory metals, such as Inconel, Kovar, etc.), such as shown by way of example in FIGS. 9A-9B. In such an embodiment, the materials of the different portions preferably exhibit some thermal expansion matching (e.g., having similar coefficients of thermal expansion). Some such embodiments may be fabricated, for example, by fabricating the portions separately and then joining them (e.g., by brazing, such as using a high-temperature braze that can tolerate the temperatures it will experience during system operation; by tacking; by mechanical means, such as press-fit and/or fasteners; etc.); however, these embodiments may additionally or alternatively be fabricated in any other suitable manner.

In some embodiments, it may be preferable for the FCSs to define an increasing cross-sectional area for input gas flow along their length, wherein the cross-sectional area increases in the downstream direction (e.g., wherein the cross-section area increases for each FCS, wherein the total cross-sectional area from all FCSs increases, etc.). Such increasing area can allow for gas expansion within the FCSs due to heating. Although the optimal ratio of cross-sectional areas between the input and output may be approximately 1:1.3, practical devices may use a larger ratio (e.g., between 1:1.3 and 1:2,between 1:2 and 1:2.4, between 1:2.4 and 1:3, greater than 1:3, etc.); however, larger ratios may reduce heat exchange efficiency and/or flow velocity, and so smaller ratios may be preferable as practical (e.g., wherein the device preferably defines a ratio that is close to the smallest practical ratio, given operational constraints and performance considerations). However, the FCSs can additionally or alternatively define any other suitable gas expansion features and/or characteristics (or may define no such features and/or characteristics).

In some embodiments, it may be preferable to reduce or minimize radial differences in temperature within the FCSs (e.g., for a given cross-sectional plane normal to a long axis defined by the burner, minimizing differences in temperature between portions of the FCSs at and/or close to the long axis versus portions of the FCSs that are farther radially outward from the long axis). For example, it may be preferable to reduce or minimize such radial temperature variations in the hottest regions of the FCSs (e.g., at or near the outlet and/or combustion region), as this can allow the FCSs to reach sufficiently high temperatures (e.g., to facilitate heat transfer, combustion, etc.) in these regions while also avoiding overheating of the FCSs in these regions. A uniform planar array of FCSs would typically experience hotter temperatures near the center than at the outer edges of the array, as the FCSs near the outer edges will typically radiate significant amounts of heat away from the burner, whereas radiation from FCSs near the center may be blocked (e.g., absorbed, reflected, etc.) by other FCSs (e.g., FCSs near the edge), and those FCSs will typically radiate heat (e.g., similar amounts of heat) back toward the FCSs near the center. In examples (e.g., as shown in FIGS. 11A-11F, in which each FCS is represented by a separate dot), such radial temperature uniformity can be achieved by reducing FCS density near the long axis (e.g., reducing the total heat generated near the long axis), ensuring lines of sight beyond the burner from the FCSs (e.g., including FCSs near the long axis), and/or in any other suitable manner. Further, in some examples, these radiatively-coupled elements (e.g., FCSs, sidewalls, etc.), or any suitable subsets and/or portions thereof, preferably exhibit high emissivity. This can include high emissivity for all wavelengths, for wavelengths most strongly involved in radiative coupling of and/or heat transfer between the elements (e.g., wavelength ranges associated with preferentially radiating heat to the heat reception region and/or electron emitter in some regions based on the spectral emissivity properties at the relevant temperatures, and/or preferentially radiating heat from the heat reception region and/or electron emitter in other regions at lower temperatures), for wavelengths at and around a spectral peak of thermal radiation during system operation such as the black-body peak and/or the peak for the emissivity of the elements in question, etc.). High emissivity can include emissivity equal or close to unity (e.g., greater than a threshold value such as 0.5, 0.6, 0.7, 0.8, 0.9, etc.) and/or mutual emissivity between the elements greater than a threshold value (e.g., greater than 0.25, 0.35, 0.4, 0.45, 0.5, 0.55, 0.6, 0.7, etc.), but alternatively can be any other suitable emissivity. Such high emissivity can, in some examples, function to enhance radiative heat transfer between the elements, which may reduce radial temperature variations.

However, the input plumbing can additionally or alternatively include any other suitable elements in any suitable arrangement.

3.2 Combustion Region.

Figure 1C:
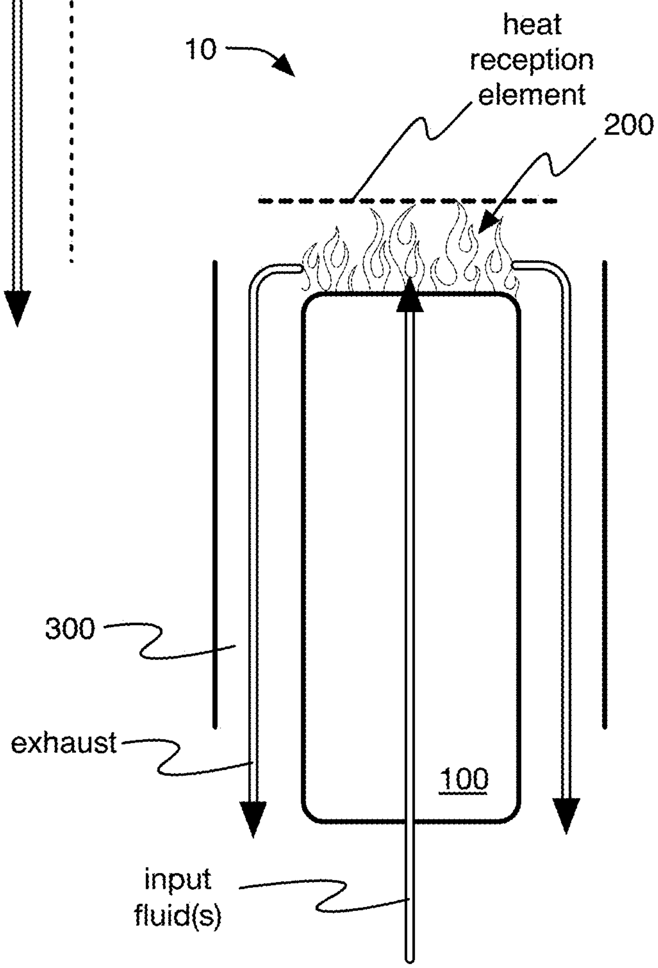
FIG. 1C is a schematic representation of the example of the burner system arranged in proximity to a heat reception element.

The combustion region 200 preferably functions as a region in which combustion of air and fuel (e.g., the air and fuel delivered by the input plumbing 100) can occur. The combustion region is preferably arranged at and/or near the outlet(s) 120 of the input plumbing. The combustion region is preferably bounded by a heat reception element, wherein the combustion region is configured to deliver heat to this heat reception element. The heat reception element is preferably substantially planar and preferably arranged opposing the outlets 120 across the combustion region (e.g., as shown in FIG. 1C).

The combustion region can include some or all of a gap defined between the input plumbing and the heat reception element. Additionally or alternatively, it may be preferable for combustion to occur within an exit region of the input plumbing (e.g., in addition to and/or instead of occurring downstream of the input plumbing, such as within the gap described above), wherein the exit region is a region of the input plumbing adjacent to the downstream exit of the input plumbing (e.g., oriented toward the heat reception element). For example, combustion within the exit region can function to heat exit region structures (e.g., portions of tubes, such as downstream tube ends), which can then radiatively heat the heat reception element (and/or any other suitable elements). In such embodiments, the input plumbing preferably assists in holding the flame within the exit region and/or the region downstream of the exit region (e.g., the gap), such as by preventing autoignition within the input plumbing upstream of the exit region and/or flashback (e.g., from the exit region and/or region downstream of it) farther into the input plumbing past the exit region, and/or by otherwise maintaining the flame at and/or near the heat reception element. In some examples of these embodiments, the input plumbing can include a constricted region (e.g., operable to prevent autoignition and/or flashback, such as described below in more detail) upstream of the exit region, and/or can widen at the exit region (e.g., thereby promoting combustion within the exit region). However, the exit region can additionally or alternatively have any other suitable characteristics (or the input plumbing can alternatively include no such region).

In embodiments in which the burner system is configured to heat a TEC, the heat reception element is preferably thermally coupled to the electron emitter of the TEC. In such embodiments, the burner system preferably delivers most of the heat it generates toward the electron emitter of the TEC, such as to a region (e.g., substantially planar region such as a disk) thermally coupled to the TEC electron emitter. More preferably, heat is delivered to that region (e.g., disk) with high uniformity, which can enable substantially uniform heating of the TEC electron emitter; additionally or alternatively, the heat reception element can enable high lateral thermal conduction (e.g., wherein the heat reception element includes a thick, high thermal conductivity material), which can function to efficiently distribute heat laterally, thereby increasing the uniformity of TEC emitter heating.

In one such embodiment, in which the TEC is configured such as described in U.S. patent application Ser. No. 16/883,762, filed 26 May 2020 and titled "SYSTEM AND METHOD FOR THERMIONIC ENERGY CONVERSION", which is herein incorporated in its entirety by this reference, the heat reception element can include one or more elements such as described regarding the 'flame-reception region' of U.S. patent application Ser. No. 16/883,762.

The heat reception element is preferably maintained at an elevated temperature during operation of the burner system (e.g., substantially equal to or greater than the temperature of other elements of the burner, such as elements within the input plumbing), which can facilitate flame holding in the combustion region. For example, in embodiments in which the burner system is configured to heat a TEC (e.g., to heat the electron emitter thereof), the heat reception element can be maintained at a temperature sufficient for efficient TEC emitter operation (e.g., greater than or equal to a threshold temperature, such as 600, 700, 800, 900, 1000, 1100, 1200, 1300, 1400, 1500, 600-700, 700-800, 800-900, 900-1000, 1000-1100, 1100-1200, 1200-1300, 1300-1400, and/or 1400-1500° C., etc.). Further, the heat reception element preferably remains at a low enough temperature to avoid or minimize undesirable effects, such as generation of significant amounts of nitrous oxides; for example, the heat reception element can be maintained below a maximum temperature (e.g., 2500, 2000, 1800, 1600, 1500, 1400, 1300, 1200, 2500-1750, 1750-1500, 1500-1400, 1400-1300, and/or 1300-1200° C., etc.). However, the heat reception element can additionally or alternatively be maintained at any other suitable temperature(s).

The combustion region is preferably maintained within a temperature range that enables efficient combustion while avoiding or minimizing undesirable effects. At undesirably low temperatures, combustion may be incomplete, and thus may be less efficient and/or may generate significant amounts of carbon monoxide. At undesirably high temperatures, combustion may result in generation of significant amounts of nitrous oxides. Accordingly, the combustion region is preferably maintained in between these temperature ranges (e.g., to enable substantially-complete combustion, and thus keep CO production low, while also keeping $NO_x$ production low), such as in the range 800-1600° C. (e.g., 1100-1400° C.). However, the combustion region can additionally or alternatively have any other suitable temperature during burner operation.

However, the combustion region 200 can additionally or alternatively have any other suitable characteristics.

3.3 Exhaust Section.

The exhaust section 300 preferably functions to evacuate combustion products from the combustion region 200 and to pre-heat the input fluids (e.g., air and/or fuel) to be combusted. The exhaust section preferably defines an exhaust path that leads downstream from the combustion region. The exhaust path preferably contacts (e.g., surrounds) the input plumbing or is otherwise thermally coupled to the input plumbing, such as via one or more heat exchangers.

The exhaust section can include one or more heat exchange elements 310. The heat exchange elements can function to facilitate heat transfer from the exhaust to the input fluids, such as by conducting heat into the input plumbing and/or directing exhaust flow in a manner configured to enhance convective heating of the input plumbing. Further, the input plumbing and/or any other suitable elements of the system can additionally or alternatively include one or more heat exchange elements 310.

In a first embodiment, the heat exchange elements include one or more protrusive elements 310*a* (e.g., fins, pins, dowels, etc.). The protrusive elements can function to facilitate heat conduction between the exhaust and the input fluids. The protrusive elements preferably include one or more thermally conductive materials (e.g., metals). The protrusive elements preferably protrude outward from the input plumbing (e.g., from one or more FCSs thereof, from an input plumbing housing containing and/or defining one or more of the FCSs, etc.), such as shown by way of examples in FIGS. 5A-5B, 6, 7, and/or 8A-8C. However, the protrusive elements can additionally or alternatively protrude into a region within the input plumbing (e.g., region containing the input fluids), such as shown by way of examples in FIGS. 7 and/or 8A-8C. In some embodiments, it can be beneficial to include heat exchange structures (such as, but not necessarily limited to, fins, pins, dowels, and/or other protrusive elements) both within the exhaust section and the input plumbing in a manner that achieves low thermal conductance mismatch between the two regions (e.g., the thermal conductance is well-matched across a boundary between the input plumbing and the exhaust section).

In some examples of this embodiment, the heat exchange elements (e.g., protrusive elements) and/or associated portions of the burner system may include one or more characteristics that enable mechanical robustness under the conditions (e.g., thermal conditions) associated with system operation. In examples, such characteristics can include one or more of: minimizing and/or avoiding stress concentrators, such as by including rounded notches and/or not including notches; minimizing material thicknesses, which can enable increased amounts of thermal expansion without mechanical damage; minimizing overall burner size; including one or more support structures, such as rings, cylinders, and/or other connections between portions of the different protrusive elements at or near their radial extrema; and/or replacing protrusive structures with lower-dimensionality features (e.g., replacing a fin with an array of pins or dowels). In one variation, the system can include a plurality of burners such as described regarding this embodiment (e.g., a cluster or array of multiple such burners); in some such examples, using multiple such burners can enable the use of smaller burners (while achieving similar heat delivery performance), which can improve mechanical robustness. In some examples of this variation, the plurality of burners may be connected to each other (e.g., mechanically, thermally, etc.), such as by one or more fins and/or other protrusive structures that extend between different burners of the plurality (e.g., as shown by way of examples in FIGS. 10A-10H); alternatively, some or all such connections could alternatively be omitted, and/or the burners can additionally or alternatively be connected in any other suitable manner. However, examples of this embodiment can additionally or alternatively include any other suitable heat-robustness characteristics (or can include no such characteristics).

In a second embodiment, the heat exchange elements can include one or more baffles 310*b*. The baffles can function to direct exhaust flow around the FCSs and are preferably used in embodiments in which the input plumbing includes multiple FCSs. In such embodiments, the burner system can include one or more baffles configured to direct exhaust flow toward particular FCSs. These baffles can additionally or alternatively function to mechanically support and/or connect the FCSs (e.g., to one another).

In one example of this embodiment, the FCSs define a cluster of tubes (e.g., substantially parallel tubes). In this example, the burner system includes one or more conical baffles that taper from a wide opening down to a narrower cross-section (e.g., directed toward the middle of the FCS cluster) along the downstream direction of the exhaust (e.g., as shown by way of example in FIGS. 3A-3D). The conical baffle is preferably open on both the wide end (e.g., does not include a cone base) and the narrow end (e.g., truncates at an opening, rather than tapering all the way to a point), wherein exhaust can flow through these openings. Thus, these conical baffles can function to direct exhaust inward from the perimeter of the FCS cluster (e.g., toward the center of the cluster). Further, the baffle(s) can optionally function to mechanically connect and/or support the FCSs.

Figure 4A:
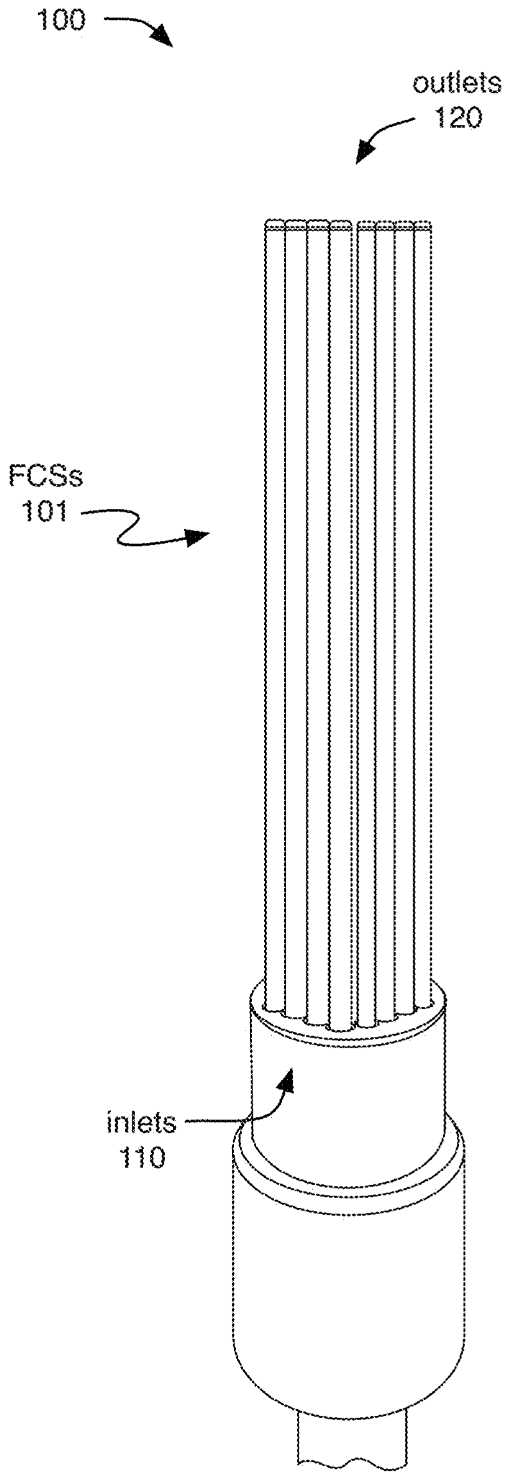
FIGS. 4A-4B are perspective views of a second and third specific example, respectively, of a portion of the burner system.
Figure 4B:
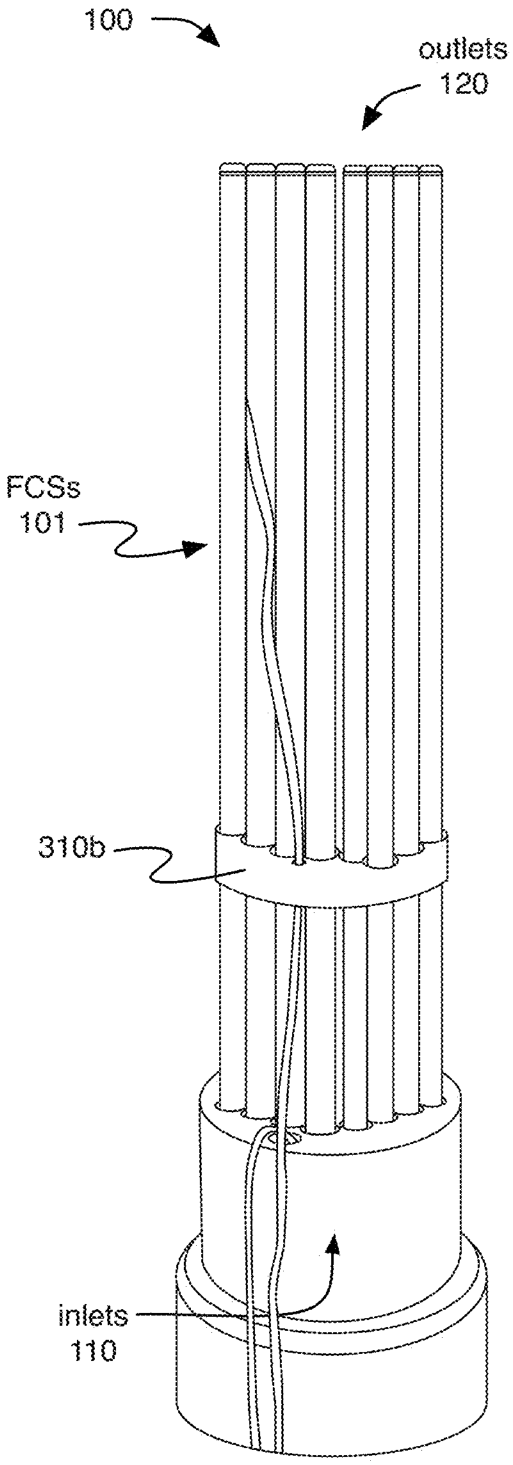

In a variation of this example, the burner system includes one or more substantially planar baffles (e.g., in addition to or in place of the conical baffle(s)). For example, the baffle(s) can define a 'grid'-like and/or 'honeycomb'-like structure, wherein the FCSs are arranged within the openings of this structure (e.g., as shown in FIG. 4B). The baffle(s) preferably define an opening in their interior (e.g., at or near the middle of the baffle and/or of the FCS cluster), through which exhaust can flow. Thus, these baffles can also function to direct exhaust inward from the perimeter of the FCS cluster (e.g., toward the center of the cluster) and/or to mechanically connect and/or support the FCSs (e.g., in manners analogous to those of the conical baffles).

Figure 13A:
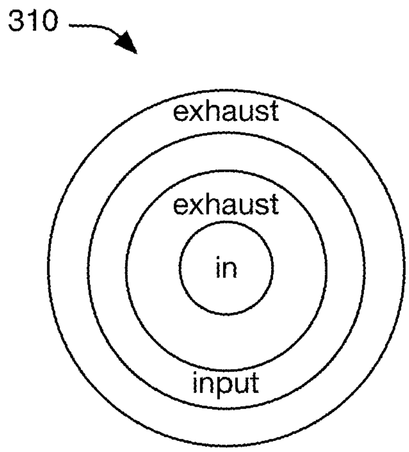
FIGS. 13A-13C are schematic representations of a first, second, and third example, respectively, of heat exchange elements of the burner system.
Figure 13B:
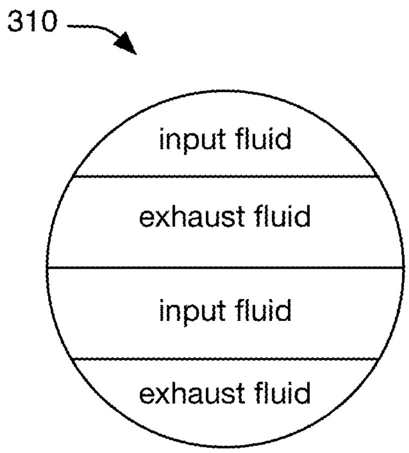
Figure 13C:
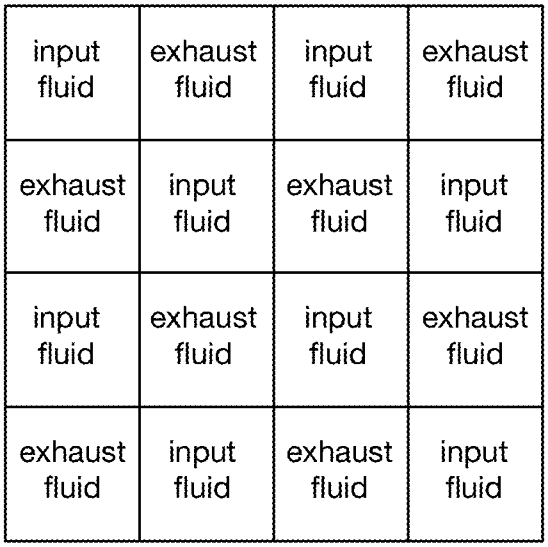

In some examples, the heat exchange elements can define numerous contact surfaces for heat exchange from high-temperature fluids to lower-temperature fluids, such as defining a plurality of adjacent flow regions with alternating contents (e.g., alternating between high-temperature exhaust and lower-temperature input fluids). In a first example, the heat exchange elements can define nested (e.g., concentric) fluid transport shells (e.g., having annular cross-sections) with alternating contents (e.g., as shown in FIG. 13A). In a second example, the heat exchange elements can include a linear array of separators that separate fluid transport regions (e.g., having rectangular cross-sections) with alternating contents (e.g., as shown in FIG. 13B). In a third example, the heat exchange elements can define a two-dimensional array (e.g., square or rectangular array) of separate fluid transport regions (e.g., having square, rectangular, circular, and/or any other suitable cross-sections) with alternating contents (e.g., as shown in FIG. 13C). In a fourth example, the heat exchange elements can define one or more gyroids and/or gyroid-like surfaces, which partition its interior into two or more volumes with alternating contents. However, the heat exchange elements can additionally or alternatively define any other suitable arrangements of fluid transport regions and/or heat exchange surfaces therebetween.

Further, the exhaust section can additionally or alternatively include any other suitable baffles, protrusive elements, and/or other heat exchange elements.

Figure 2A:
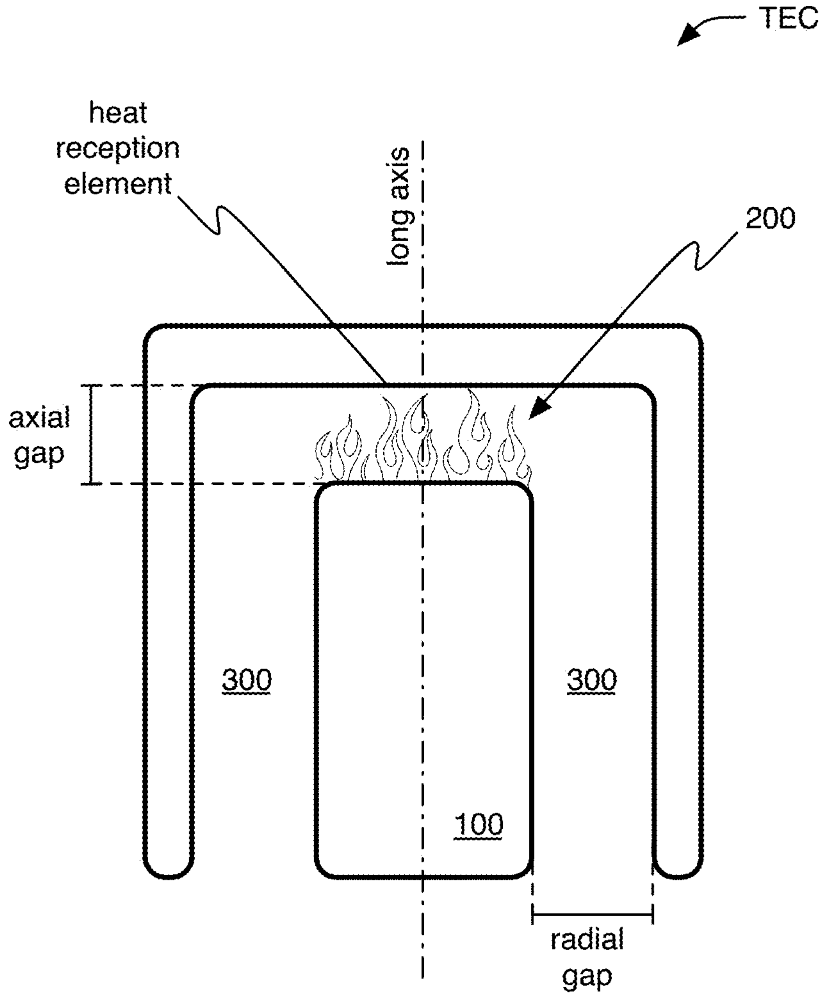
FIG. 2A is a schematic representation of an embodiment of the burner system delivering heat to a thermionic energy converter.
Figure 2B:
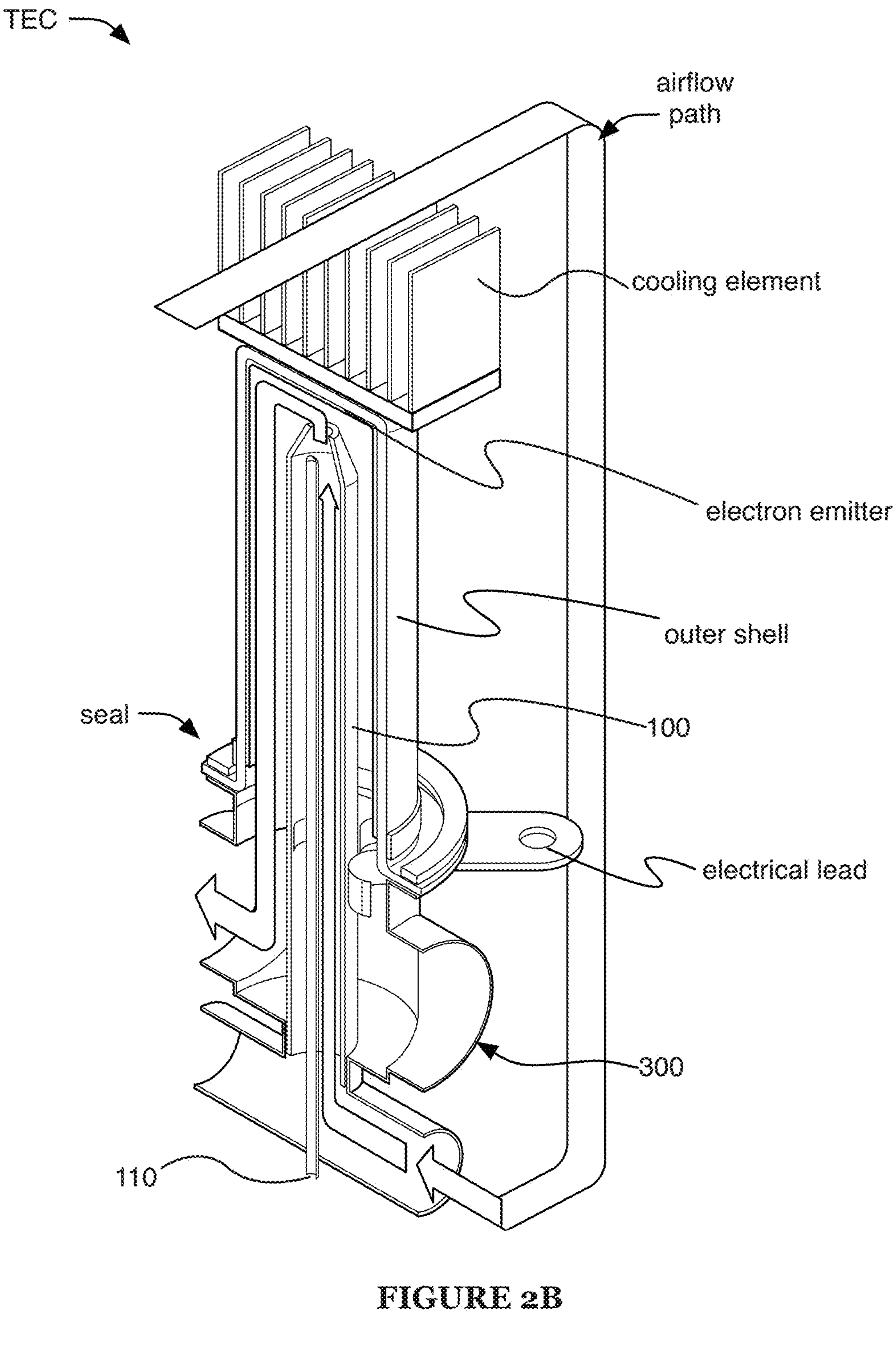
FIG. 2B is a cross-sectional perspective view of a specific example of the burner system delivering heat to a thermionic energy converter.

The exhaust section preferably includes an outer boundary (e.g., wherein the exhaust section is defined within the outer boundary, and other elements of the system, such as the input plumbing, are preferably contained within the outer boundary), such as a boundary defined by a shell (e.g., as shown in FIGS. 1C, 2A, and/or 2B). In some embodiments, this outer boundary can be defined by a portion of another system coupled to the burner system (e.g., a system configured to be heated by the burner). For example, in embodiments in which the burner system is configured to heat a TEC (e.g., to heat the electron emitter thereof), the outer boundary of the system can be defined by the TEC (e.g., by a portion of the TEC thermally and/or electrically connected to the electron emitter). In a specific example, the burner system is integrated with the TEC such as described in U.S. patent application Ser. No. 16/883,762, filed 26 May 2020 and titled "SYSTEM AND METHOD FOR THERMIONIC ENERGY CONVERSION", which is herein incorporated in its entirety by this reference (e.g., wherein the outer boundary is defined by the 'inner shell 120' described in U.S. patent application Ser. No. 16/883,762).

Such integration can facilitate heat transfer from the burner (e.g., from the combustion region, from the exhaust, etc.) to the TEC (e.g., to the electron emitter and/or elements thermally coupled to the electron emitter). In some variants, this integration can include one or more heat exchange elements 310 of the burner system (e.g., enabling conductive heating of the TEC by the burner, instead of or in addition to convective and/or radiative heating). Such integration can include elements configured to heat the heat reception element (e.g., broad face or other element arranged opposing the input plumbing outlet across the combustion region, preferably proximal to the electron emitter) and/or one or more sidewalls (e.g., tube, such as a cylindrical tube, surrounding the burner, such as arranged radially outward from the input plumbing). In some examples, the gap (e.g., axial gap) between the heat reception element and the burner (e.g., the FCS outlets thereof) can be minimized (e.g., given certain operational parameters and tolerances, such as thermal expansion allowances, parallelism and/or concentricity tolerances, combustion-related requirements and/or performance considerations such as flame-holding requirements and/or considerations, etc.) and/or otherwise maintained at a small value (e.g., relative to the overall dimensions of the system and/or the components thereof), as such small axial gap sizing can help promote heat transfer from the burner to the heat reception element; in some such examples, in which a small axial gap reduces flame-holding performance (e.g., promotes undesired flashback and/or autoignition), burner operation can optionally be altered to compensate and/or otherwise improve flame-holding performance (e.g., using a non-stoichiometric mixture of fuel and oxygen to prevent and/or reduce undesired flashback and/or autoignition).

In some examples, it may be preferable to prioritize heat transfer toward the TEC and/or heat reception element (e.g., heat transfer along a direction from the FCS outlets toward the heat reception element). However, it may additionally or alternatively be beneficial to promote heat transfer to the sidewalls and/or any other suitable elements thermally coupled to the electron emitter; for example, although heat transferred from the burner toward the TEC and/or heat reception element may be the most effective at heating the electron emitter, heat transferred from the burner to the sidewalls can also indirectly promote heating of the electron emitter (e.g., by raising the temperature of the sidewalls and/or reducing the difference in temperature between the sidewalls and the heat reception element and/or the TEC, thereby reducing heat flux away from the heat reception element and/or TEC to the sidewalls). In some examples, the gap (e.g., radial gap) between the sidewalls and the outer portion of the burner can be minimized (e.g., given certain operational parameters and tolerances, such as thermal expansion allowances, parallelism and/or concentricity tolerances, etc.) and/or otherwise maintained at a small value (e.g., relative to the overall dimensions of the system and/or the components thereof), as such small radial gap sizing can help promote heat transfer from the burner to the sidewalls. Additionally or alternatively, the burner system can include one or more thermally-conductive elements that thermally couple the burner and the sidewalls (e.g., by directly connecting the burner to the sidewalls using one or more thermal conductors); for example the burner can be mechanically bonded to one or more sidewalls (e.g., by a thermally-conductive bonding material), or the burner and sidewalls can be of unitary construction (e.g., fabricated together as a unitary piece, such as via additive manufacturing processes).

However, in alternate embodiments, the outer boundary can be defined by a standalone portion of the burner (e.g., wherein the burner defines a standalone unit, such as a system configured to operate by itself, assuming provision of appropriate input fluids and exhaust handling), and/or can be defined in any other suitable manner.

3.4 Exemplary Embodiments.

In a first embodiment of the burner system, the input plumbing includes a plurality of wedge-shaped FCSs (e.g., as shown in FIGS. 5A-5B). In this example, the input plumbing can include a single large cylindrical tube and a plurality of walls extending inward from this tube to define the FCSs. The input plumbing can optionally include a central cylindrical tube (e.g., at which these walls meet), which can function as an ignitor housing (e.g., containing one or more ignitors operable to ignite the input fluids, such as one or more spark ignitors and/or hot surface ignitors) and/or have any other suitable function (e.g., function as an FCS configured to supply air, fuel, and/or a mixture thereof). In this example, the burner system can include a plurality of protrusive elements 310*a* (e.g., fins) extending radially outward from the input plumbing, which can function to enhance heat transfer from the exhaust fluid to the input fluids. In examples, the fins can include straight fins (e.g., extending substantially parallel to the FCSs), helical fins, twisting fins, undulating fins, and/or fins of any other suitable shapes.

In a second embodiment of the burner system, the input plumbing includes a plurality of tubes (FCSs) arranged in a cluster, such as substantially parallel tubes that, in some examples, may substantially define a regular array (e.g., 2-dimensional array, such as a hexagonal array or rectangular array). Each of these tubes preferably narrows near its outlet 120, thereby defining a flow restriction 130.

In some examples of this embodiment, the tubes are arranged such that radial differences in temperature are reduced (e.g., as described above in more detail), such as shown by way of specific examples in FIGS. 11A-11F. For example, the tubes may be arranged such that all or substantially all tubes have one or more lines of sight out of the burner (e.g., as shown by way of examples in FIGS. 11B-11C), and/or the tubes may be arranged with lower tube density near the center of the cluster (e.g., as shown by way of examples in FIGS. 11D-11F).

The tubes are preferably mechanically connected to each other (e.g., directly connected to each other, each connected to a shared base, connected in any other suitable manner). In some examples of this embodiment, the tubes can be mechanically connected by one or more baffles 310*b*. Such baffles can include baffles configured to direct exhaust flow inward (e.g., from and/or near the FCS cluster exterior to its interior, such as toward its center; farther inward from an intermediate depth within the FCS cluster; etc.), outward (e.g., toward the FCS cluster exterior from its interior, such as from or near its center; outward from an intermediate depth within the FCS cluster; etc.), laterally (e.g., directing exhaust from one side of the cluster toward the other), circumferentially, and/or in any other suitable directions. In examples, the baffles can include annular baffles (e.g., configured to direct exhaust both inward and outward from an intermediate depth within the FCS cluster), helical baffles, twisting baffles, undulating baffles, and/or any other suitable baffles.

In a first specific example, the burner system includes a conical baffle (e.g., a single conical baffle, such as shown by way of example in FIGS. 3A-3D). In this specific example, the baffle narrows along the downstream direction of the exhaust path (e.g., is at its widest near the input plumbing outlets). The baffle is preferably open on both the wide and narrow ends, which can function to direct the exhaust fluids from the outer FCSs toward the inner FCSs as it travels along the exhaust path.

In a second specific example, the burner system includes a substantially planar baffle (e.g., a single substantially planar baffle, such as shown by way of example, in FIG. 4B). The planar baffle preferably defines a broad face, which is substantially normal to the FCS fluid flow direction (e.g., to a long axis defined by an FCS tube). The baffle can optionally include an opening (e.g., at or near the center of the baffle), which can facilitate exhaust flow from one side of the baffle to the other along the exhaust path.

In alternate variations, the burner system can include multiple baffles. In some such variations, the baffles can function to impart one or more lateral (e.g., radial, circumferential, etc.) velocity components to the exhaust flow (e.g., flow component in one or more directions normal to the axial direction, such as cross-flow directed toward, away from, and/or circumferential to the long axis and/or the overall exhaust flow direction), and can additionally or alternatively function to create exhaust counter-flow conditions (e.g., flow component in an axial direction opposing the overall exhaust flow direction, such as counter-flow directed back toward the combustion region). For example, the system can include a repeating pattern (or any other suitable arrangement) of baffles of different shapes proceeding along the direction of exhaust flow. In a specific example, the system includes a first baffle configured to direct exhaust from a first side of the cluster toward a second side, then a second baffle configured to direct exhaust from the second side toward the first side, then a third baffle configured to direct exhaust from the first side toward the second side, and so on. However, the burner system can additionally or alternatively include any other suitable baffle (s).

Although described herein as 'baffles', a person of skill in the art will recognize that the burner system can additionally or alternatively include structures that mechanically support and/or connect other elements of the system (and/or have any other suitable functions) but that do not substantially function to redirect exhaust flow within the system. Such structures can have any suitable characteristics such as described herein regarding the baffles (and/or can additionally or alternatively have any other suitable characteristics).

In a variation of this embodiment, the burner system includes a plurality of protrusive elements 310*a* (e.g., fins), such as fins extending radially outward from the cluster of tubes (e.g., as shown in FIG. 6). For example, the burner system can include these radial fins rather than including a baffle 310*b* (e.g., conical or planar baffle). In examples, the fins can include straight fins (e.g., extending substantially parallel to the FCSs), helical fins, twisting fins, undulating fins, and/or fins of any other suitable shapes.

In some variations, the system can include both one or more protrusive elements and one or more baffles, and/or can include any other suitable heat exchange elements.

Some or all of the heat exchange elements (and/or any other suitable elements of the system), such as the baffles and/or protrusive elements, are preferably configured to aid in matching of fluid flow speeds between the exhaust section and the input plumbing (e.g., configured to ensure that the exhaust flow rate is substantially equal to the input fluid flow rate, such as within a threshold difference such as 2%, 5%, 10%, 20%, 50%, 1-3%, 3-10%, 10-30%, 30-100%, less than 1%, and/or greater than 100%, etc.). Such flow rate matching can enhance heat transfer between the fluids (from the hot exhaust to the colder input fluids).

Some or all of the heat exchange elements preferably exhibit rough surface characteristics (e.g., 'as finished' material surfaces), which can function to enhance thermal exchange. However, the heat exchange elements can additionally or alternatively have any other suitable characteristics.

However, the burner system 10 can additionally or alternatively include any other suitable elements in any suitable arrangement.

4. Method

Figure 12A:
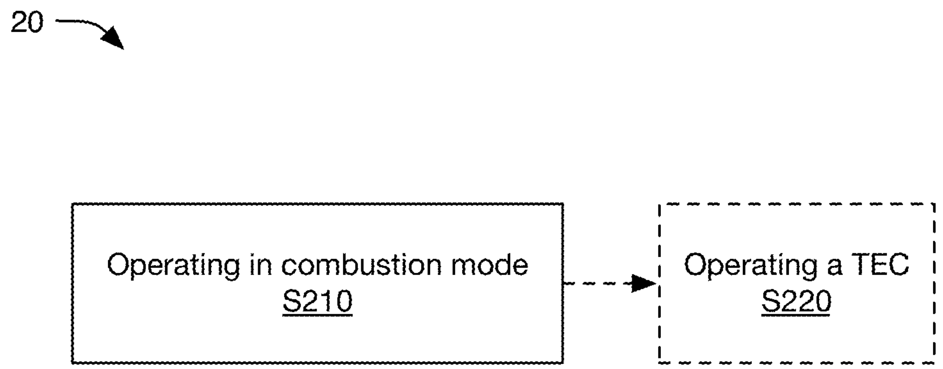
FIG. 12A is a schematic representation of an embodiment of a method of burner system operation.

As described above, the method 20 of burner system operation preferably includes operating the burner system in a combustion mode S210 (e.g., in which the burner system combusts fuel and air, and delivers some or all of the resulting heat to a heat reception region, such as a region of a TEC), such as shown by way of example in FIG. 12A. The method 20 can optionally include adjusting between different combustion modes (e.g., involving different fuel flow rates, fuel-air ratios, temperatures, etc.), transitioning between the combustion mode(s) and an inactive mode (e.g., in which no or substantially no combustion occurs), switching between different fuels and/or fuel sources, and/or any other suitable elements. The method for thermionic energy generation preferably functions to heat the TEC, more preferably heating the TEC such that the TEC generates an electrical output (e.g., provide electrical power to an external load).

Accordingly, the method 20 can optionally include (e.g., in response to and/or as a result of operating the burner system in the combustion mode) operating a TEC S220, such as using heat delivered to the TEC to drive an electric load and/or otherwise provide an electrical power output. For example, operating the burner system in the combustion mode can heat the electron emitter of the TEC, thereby causing it to emit electrons across a gap, to be absorbed by an electron collector held at a different potential than the electron emitter. However, the method can additionally or alternatively include any other suitable elements.

Figure 12B:
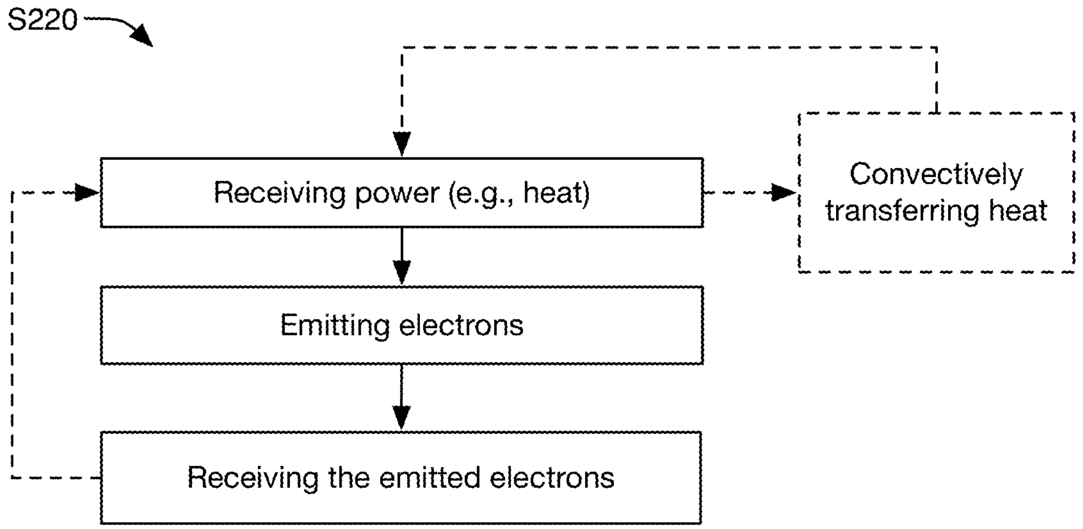
FIG. 12B is a schematic representation of an example of a portion of the method.

Operating the TEC S220 preferably includes receiving power (e.g., receiving heat, preferably from the burner), emitting electrons, and receiving the emitted electrons, and can optionally include convectively transferring heat and/or any other suitable elements (e.g., as shown in FIG. 12B). The method is preferably performed using the system 10 for thermionic energy generation described above, but can additionally or alternatively be performed using any other suitable system(s). In some examples, S220 can include one or more elements such as described in U.S. patent application Ser. No. 17/866,381, filed 15 Jul. 2022 and titled "SYSTEM AND METHOD FOR THERMIONIC ENERGY CONVERSION", and/or in U.S. patent application Ser. No. 17/993,195, filed 23 Nov. 2022 and titled "SYSTEM AND METHOD FOR WORK FUNCTION REDUCTION AND THERMIONIC ENERGY CONVERSION", each of which is herein incorporated in its entirety by this reference (e.g., as described in U.S. patent application Ser. No. 17/866,381 regarding the 'method 20' and/or as described in U.S. patent application Ser. No. 17/993,195 regarding the 'method 300'). However, S220 can additionally or alternatively include any other suitable elements.

The FIGURES illustrate the architecture, functionality and operation of possible implementations of systems, methods and computer program products according to preferred embodiments, example configurations, and variations thereof. In this regard, each block in the flowchart or block diagrams may represent a module, segment, step, or portion of code, which comprises one or more executable instructions for implementing the specified logical function(s). It should also be noted that, in some alternative implementations, the functions noted in the block can occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As a person skilled in the art will recognize from the previous detailed description and from the figures and claims, modifications and changes can be made to the preferred embodiments of the invention without departing from the scope of this invention defined in the following claims.

We claim:

1. A system comprising:

an input plumbing defining an inlet, an outlet, and a long axis extending from the inlet to the outlet, the input plumbing configured to convey an input fluid comprising a fuel and an oxidant, the input plumbing comprising:

a plurality of fluid conveyance structures (FCSs), each FCS of the plurality extending between the inlet and the outlet, each FCS of the plurality defining a respective FCS interior configured to convey the input fluid from the inlet to the outlet along a respective FCS path, wherein the plurality of FCSs comprises a first FCS defining a first FCS interior and a first FCS path, wherein the first FCS interior defines a first cross-sectional area for fluid flow, the first cross-sectional area defined on a first plane normal to the first FCS path, the first plane arranged between the inlet and the outlet; and a flow restrictor fluidly coupled to the first FCS interior, the flow restrictor defining a second cross-sectional area for fluid flow, the second cross-sectional area defined on a second plane normal to the first FCS path, wherein the first cross-sectional area is greater than the second cross-sectional area and the second cross-sectional area is greater than zero, wherein the second plane is arranged between the first plane and the outlet;

a heat reception element arranged along the long axis, wherein the outlet is arranged between the inlet and the heat reception element, the burner system defining a combustion region between the outlet and the heat reception element, the combustion region fluidly coupled to the first FCS interior via the flow restrictor;

an exhaust section defining an exhaust interior fluidly coupled to the combustion region, the exhaust interior defining an exhaust flow path, the exhaust section thermally coupled to each FCS of the plurality of FCSs;

a first plurality of protrusive structures that protrude outward from the input plumbing into the exhaust interior, wherein the first plurality of protrusive structures are configured to thermally couple the input plumbing to the exhaust; and a second plurality of protrusive structures that protrude inward from the input plumbing into the first FCS interior, wherein the second plurality of protrusive structures are configured to thermally couple the input fluid to the input plumbing, such that the first and second pluralities of protrusive structures cooperatively thermally couple the input fluid to the exhaust.

2. The system of claim 1, wherein, between the inlet and the flow restrictor, the input plumbing defines a substantially consistent cross-section normal to the long axis, wherein the first plane lies between the inlet and the flow restrictor.

3. The system of claim 1, wherein the input plumbing further comprises a plurality of flow restrictors comprising the flow restrictor, each flow restrictor of the plurality fluidly coupled to the FCS interior of a different FCS of the plurality of FCSs.

4. A system comprising:

an input plumbing defining an inlet, an outlet, and a long axis extending from the inlet to the outlet, the input plumbing configured to convey an input fluid comprising a fuel and an oxidant, the input plumbing comprising:

a plurality of fluid conveyance structures (FCSs), each FCS of the plurality extending between the inlet and the outlet, each FCS of the plurality defining a respective FCS interior configured to convey the input fluid from the inlet to the outlet along a respective FCS path, wherein the plurality of FCSs comprises:

a first FCS defining a first FCS interior and a first FCS path, wherein the first FCS interior defines a first cross-sectional area for fluid flow, the first cross-sectional area defined on a first plane normal to the first FCS path, the first plane arranged between the inlet and the outlet; and a second FCS;

a flow restrictor fluidly coupled to the first FCS interior, the flow restrictor defining a second cross-sectional area for fluid flow, the second cross-sectional area defined on a second plane normal to the first FCS path, wherein the first cross-sectional area is greater than the second cross-sectional area and the second cross-sectional area is greater than zero, wherein the second plane is arranged between the first plane and the outlet;

a heat reception element arranged along the long axis, wherein the outlet is arranged between the inlet and the heat reception element, the burner system defining a combustion region between the outlet and the heat reception element, the combustion region fluidly coupled to the first FCS interior via the flow restrictor;

an exhaust section defining an exhaust interior fluidly coupled to the combustion region, the exhaust interior defining an exhaust flow path, the exhaust section thermally coupled to each FCS of the plurality of FCSs; and for each FCS of the plurality: a respective plurality of protrusive structures that protrude outward from the FCS into the exhaust interior;

wherein:

the respective plurality of protrusive structures is configured to thermally couple the FCS to the exhaust;

the respective plurality of protrusive structures for the first FCS comprises a first protrusive structure; and the respective plurality of protrusive structures for the second FCS comprises a second protrusive structure mechanically connected to the first protrusive structure.

5. A system comprising:

an input plumbing defining an inlet, an outlet, and a long axis extending from the inlet to the outlet, the input plumbing configured to convey an input fluid comprising a fuel and an oxidant, the input plumbing comprising:

a plurality of fluid conveyance structures (FCSs), each FCS of the plurality extending between the inlet and the outlet, each FCS of the plurality defining a respective FCS interior configured to convey the input fluid from the inlet to the outlet along a respective FCS path, wherein the plurality of FCSs comprises a first FCS defining a first FCS interior and a first FCS path, wherein the first FCS interior defines a first cross-sectional area for fluid flow, the first cross-sectional area defined on a first plane normal to the first FCS path, the first plane arranged between the inlet and the outlet; and, a flow restrictor fluidly coupled to the first FCS interior, the flow restrictor defining a second cross-sectional area for fluid flow, the second cross-sectional area defined on a second plane normal to the first FCS path, wherein the first cross-sectional area is greater than the second cross-sectional area and the second cross-sectional area is greater than zero, wherein the second plane is arranged between the first plane and the outlet;

a heat reception element arranged along the long axis, wherein the outlet is arranged between the inlet and the heat reception element, the burner system defining a combustion region between the outlet and the heat reception element, the combustion region fluidly coupled to the first FCS interior via the flow restrictor; and an exhaust section defining an exhaust interior fluidly coupled to the combustion region, the exhaust interior defining an exhaust flow path, the exhaust section thermally coupled to each FCS of the plurality of FCSs;

wherein:

each FCS of the plurality is arranged substantially parallel to the long axis;

the plurality of FCSs define an FCS density, defined as the number of FCSs within a unit area, that varies as a function of radial distance from the long axis, wherein:

the plurality of FCSs define a maximum radial distance equal to the greatest distance between the long axis and any FCS of the plurality; and the FCS density increases with increasing radial distance between zero and the maximum radial density.

6. The system of Claim 5, further comprising, for each FCS of the plurality: a respective plurality of protrusive structures that protrude outward from the FCS into the exhaust interior, wherein the respective plurality of protrusive structures is configured to thermally couple the FCS to the exhaust.

7. The system of claim 3, wherein:

each FCS of the plurality comprises a metal; and the system further comprises a unitary ceramic body comprising the plurality of flow restrictors.

8. The system of Claim 5, further comprising a first plurality of protrusive structures that protrude outward from the input plumbing into the exhaust interior, wherein the first plurality of protrusive structures are configured to thermally couple the input plumbing to the exhaust.

9. The system of Claim 4, further comprising a second plurality of protrusive structures that protrude inward from the input plumbing into the first FCS interior, wherein the second plurality of protrusive structures are configured to thermally couple the input fluid to the input plumbing.

10. The system of claim 1, wherein the flow restrictor defines a circuitous flow path between the first FCS interior and the outlet.

11. The system of claim 10, wherein the flow restrictor comprises a porous material that defines the circuitous flow path.

12. The system of claim 1, further comprising a thermionic energy converter (TEC), the TEC comprising an electron emitter thermally coupled to the heat reception element.

13. The system of claim 12, wherein the TEC further comprises a sidewall thermally coupled to the electron emitter, the sidewall encircling the input plumbing and the exhaust interior.

14. The system of Claim 13, wherein the sidewall bounds the exhaust interior.

15. The system of claim 1, wherein the input fluid comprises the fuel and air, wherein the oxidant is gaseous oxygen of the air.

16. The system of claim 1, wherein:

for each FCS of the plurality of FCSs, the system comprises a respective plurality of flow restrictors fluidly coupled to the FCS interior of the FCS;

the respective plurality of flow restrictors fluidly coupled to the first FCS interior comprises the flow restrictor; and the respective plurality of flow restrictors fluidly coupled to the first FCS interior defines a third cross-sectional area for fluid flow, the third cross-sectional area defined on the second plane, wherein the first cross-sectional area is greater than the third cross-sectional area.

17. The system of claim 4, wherein the input fluid comprises the fuel and air, wherein the oxidant is gaseous oxygen of the air.

18. The system of claim 5, wherein the input fluid comprises the fuel and air, wherein the oxidant is gaseous oxygen of the air.

19. The system of claim 5, wherein:

for each FCS of the plurality of FCSs, the system comprises a respective plurality of flow restrictors fluidly coupled to the FCS interior of the FCS;

the respective plurality of flow restrictors fluidly coupled to the first FCS interior comprises the flow restrictor; and the respective plurality of flow restrictors fluidly coupled to the first FCS interior defines a third cross-sectional area for fluid flow, the third cross-sectional area defined on the second plane, wherein the first cross-sectional area is greater than the third cross-sectional area.

20. The system of claim 4, wherein:

the input plumbing further comprises a plurality of flow restrictors comprising the flow restrictor, each flow restrictor of the plurality fluidly coupled to the FCS interior of a different FCS of the plurality of FCSs;

each FCS of the plurality comprises a metal; and the system further comprises a unitary ceramic body comprising the plurality of flow restrictors.

* * * * *